(12) United States Patent
Hayashi

(10) Patent No.: US 11,055,031 B2
(45) Date of Patent: Jul. 6, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Koji Hayashi, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 173 days.

(21) Appl. No.: 16/007,140

(22) Filed: Jun. 13, 2018

(65) Prior Publication Data

US 2018/0373470 A1    Dec. 27, 2018

(30) Foreign Application Priority Data

Jun. 27, 2017  (JP) .............................. JP2017-124821

(51) Int. Cl.
*G06F 3/12* (2006.01)
*H04N 1/00* (2006.01)
*G06F 3/0481* (2013.01)

(52) U.S. Cl.
CPC .......... *G06F 3/1204* (2013.01); *G06F 3/1254* (2013.01); *G06F 3/1257* (2013.01); *G06F 3/1285* (2013.01); *H04N 1/00411* (2013.01); *H04N 1/00514* (2013.01); *H04N 1/00517* (2013.01); *G06F 3/04817* (2013.01); *G06F 3/1205* (2013.01); *G06F 3/1229* (2013.01)

(58) Field of Classification Search
USPC .................. 358/426.06, 1.1–3.29; 399/8–85; 714/100, 1–57, 699, 700
See application file for complete search history.

(56) References Cited

U.S. PATENT DOCUMENTS

2003/0090695 A1*  5/2003  Murata ................. G06F 3/1205
                                                                358/1.13
2010/0037156 A1*  2/2010  Hosoda .................... G06F 8/38
                                                                715/763

(Continued)

FOREIGN PATENT DOCUMENTS

JP    2015-194941 A    11/2015
JP    2017-091303 A    5/2017

OTHER PUBLICATIONS

Feb. 24, 2021 Office Action issued in Japanese Patent Application No. 2017-124821.

*Primary Examiner* — Marcellus J Augustin
(74) *Attorney, Agent, or Firm* — Oliff PLC

(57) ABSTRACT

An information processing apparatus includes an execution unit, a detector, a receiver, and a controller. The execution unit executes, when processing execution data for executing specified processing is selected, the specified processing with a setting set in the processing execution data. The detector detects a state change in the information processing apparatus. The receiver receives in advance an item of a setting for which a user accepts that the setting will be changed. The controller controls the receiver, if a state change detected by the detector is a change concerning an item of a setting for which the user accepts that the setting will be changed, so that the setting of the item will be changed and then execution of the processing of the processing execution data will be accepted.

10 Claims, 29 Drawing Sheets

(56) References Cited

U.S. PATENT DOCUMENTS

| | | | | |
|---|---|---|---|---|
| 2011/0188073 A1* | 8/2011 | Akutsu | ................... | G06F 15/00 |
| | | | | 358/1.15 |
| 2011/0310428 A1* | 12/2011 | Ciriza | ................... | G06F 3/1219 |
| | | | | 358/1.15 |
| 2015/0029552 A1* | 1/2015 | Nishizawa | ............ | G06F 3/1288 |
| | | | | 358/1.15 |
| 2015/0046879 A1* | 2/2015 | Orimoto | .............. | G06K 15/005 |
| | | | | 715/835 |
| 2015/0172487 A1* | 6/2015 | Kirihara | ................ | G06F 3/1284 |
| | | | | 358/1.14 |
| 2015/0301768 A1* | 10/2015 | Nishiyama | ............ | G06F 3/1257 |
| | | | | 358/1.15 |
| 2018/0084122 A1* | 3/2018 | Kamoi | ................ | H04N 1/00424 |

\* cited by examiner

FIG. 16

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-124821 filed Jun. 27, 2017.

BACKGROUND

(i) Technical Field

The present invention relates to an information processing apparatus and a non-transitory computer readable medium.

(ii) Related Art

In an image forming device, a one touch app (processing execution data) in which a procedure of processing steps to be executed is preset is generated. Then, a user is able to execute specified processing with a preset procedure by merely selecting a generated one touch app.

SUMMARY

According to an aspect of the invention, there is provided an information processing apparatus including an execution unit, a detector, a receiver, and a controller. The execution unit executes, when processing execution data for executing specified processing is selected, the specified processing with a setting set in the processing execution data. The detector detects a state change in the information processing apparatus. The receiver receives in advance an item of a setting for which a user accepts that the setting will be changed. The controller controls the receiver, if a state change detected by the detector is a change concerning an item of a setting for which the user accepts that the setting will be changed, so that the setting of the item will be changed and then execution of the processing of the processing execution data will be accepted.

BRIEF DESCRIPTION OF THE DRAWINGS

An exemplary embodiment of the present invention will be described in detail based on the following figures, wherein:

FIGS. 7 through 16 are examples of display screens for explaining steps of creating a one touch app;

DETAILED DESCRIPTION

An exemplary embodiment of the invention will be described below with reference to the accompanying drawings.

Figure 1:
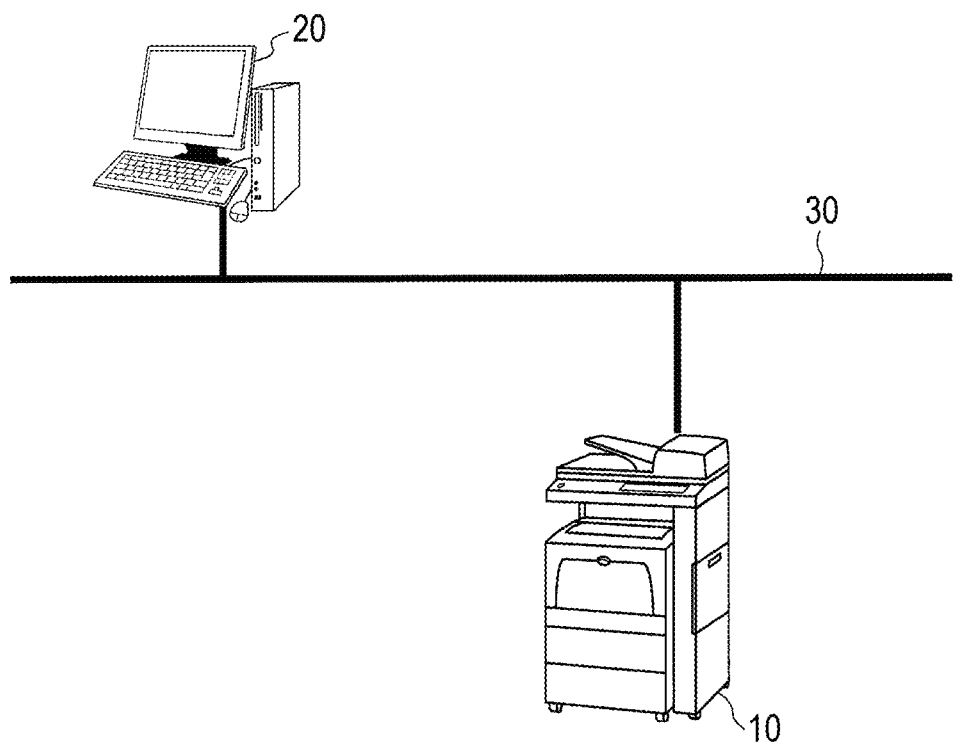
FIG. 1 illustrates an example of the configuration of an image forming system according to the exemplary embodiment.

FIG. 1 illustrates an example of the configuration of an image forming system according to the exemplary embodiment.

The image forming system shown in FIG. 1 includes an image forming device 10 and a terminal device 20 connected to each other via a network 30. The terminal device 20 generates print data and sends it to the image forming device 10 via the network 30. The image forming device 10 receives the print data and outputs an image represented by the print data onto a sheet. The image forming device 10 is a so-called multifunction device having multiple functions, such as a print function, a scan function, a copy function, and a fax sending-and-receiving function.

Figure 2:
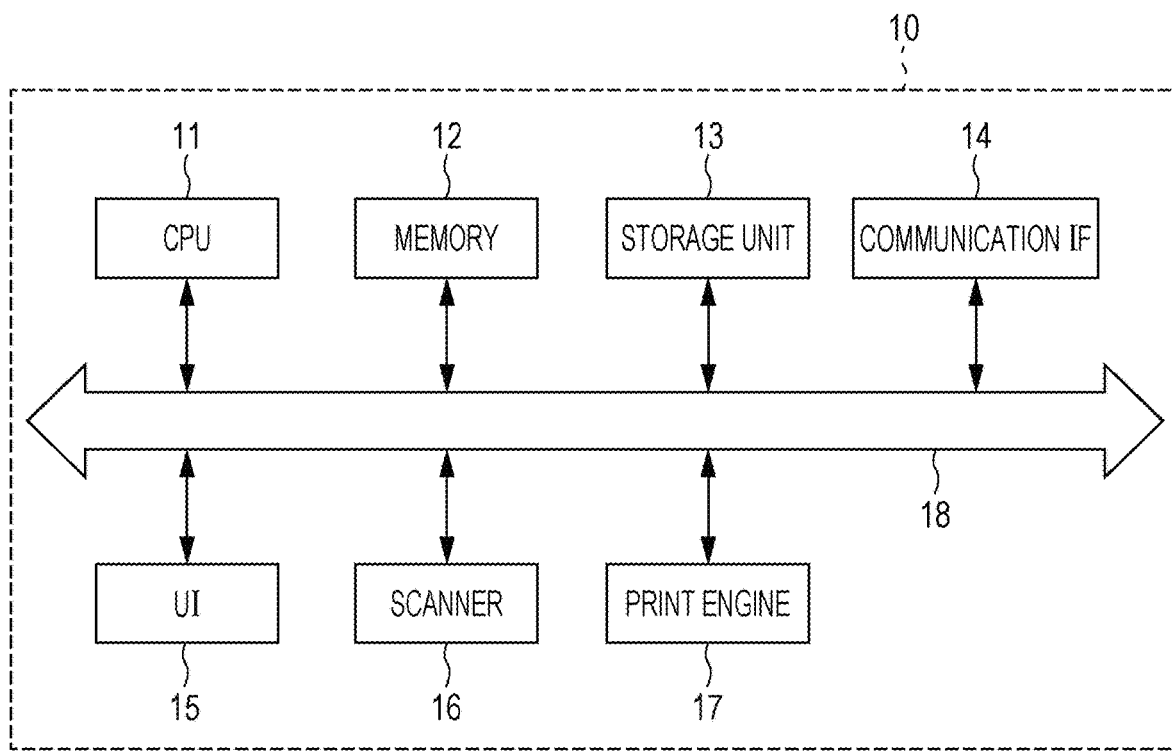
FIG. 2 is a block diagram illustrating an example of the hardware configuration of an image forming device in the image forming system according to the exemplary embodiment.

An example of the hardware configuration of the image forming device 10 is shown in FIG. 2.

As shown in FIG. 2, the image forming device 10 includes a central processing unit (CPU) 11, a memory 12, a storage unit 13, such as a hard disk drive (HDD), a communication interface (IF) 14 that sends and receives data to and from an external device via the network 30, a user interface (UI) including a touch panel or a liquid crystal display and a keyboard, a scanner 16, and a print engine 17. These elements are connected to one another via a control bus 18.

The print engine 17 prints an image on a recording medium, such as a print sheet, after performing process steps, such as charging, exposure, developing, transferring, and fixing.

The CPU 11 executes predetermined processing based on a control program stored in the memory 12 or the storage unit 13 so as to control the operation of the image forming device 10.

In this exemplary embodiment, the control program executed by the CPU 11 is stored in the memory 12 or the storage unit 13. However, the control program may be stored in a storage medium, such as a compact disc-read only memory (CD-ROM), and be provided to the CPU 11.

Figure 3:
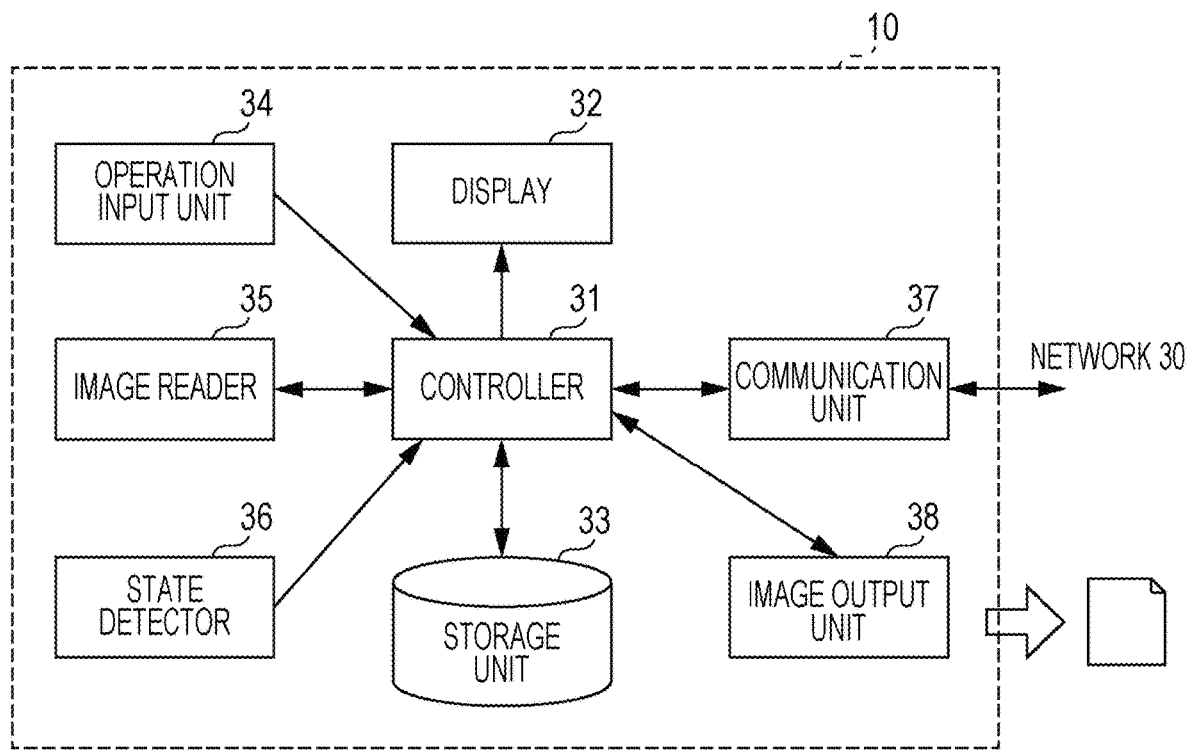
FIG. 3 is a block diagram illustrating an example of the functional configuration of the image forming device.

FIG. 3 is a block diagram illustrating an example of the functional configuration of the image forming device 10 implemented by executing the above-described control program.

As shown in FIG. 3, the image forming device 10 includes a controller 31, a display 32, a storage unit 33, an operation input unit 34, an image reader 35, a state detector 36, a communication unit 37, and an image output unit 38.

The display 32 is constituted by an operation panel, such as a touch panel, and receives an operation performed on the image forming device 10 and presents operation results, processing results, and so on, to a user.

The storage unit 33 is a memory for temporarily storing image data while the controller 31 is executing processing. The operation input unit 34 is used for inputting various operations performed by a user. The image reader 35 reads a document set in the image forming device 10 and converts an image of the document into image data.

The state detector 36 detects that the state of the image forming device 10 has changed. More specifically, the state detector 36 detects as a state change, for example, that a post-processor performing post-processing, such as stapling or punching, is connected to the image forming device 10 or that consumables, such as toner and print sheets, have run out.

The state detector 36 also detects as a state change, for example, that authorization given to a certain user, that is, the range of processing that the user is allowed to perform, has changed. For example, the state detector 36 detects as a state change that authorization to perform color printing has been canceled for a certain user due to the passage of time or a change in authorization settings.

The communication unit 37 receives data source from an external device, such as the terminal device 20. For example, the communication unit 37 receives a print job from the terminal device 20, sends image data by fax to the terminal device 20, and sends and receives email to and from the terminal device 20.

In response to an instruction from the controller 31, the image output unit 38 prints image data on a recording medium, such as a print sheet, and outputs the printed recording medium.

The controller 31 controls the display 32, the storage unit 33, the operation input unit 34, the image reader 35, the state detector 36, the communication unit 37, and the image output unit 38 so as to execute various operations, such as printing, copying, and reading of a document image.

The display 32 displays icons for selecting the execution of various functions on a screen. When one of the icons displayed on the screen of the display 32 is selected by a user, the controller 31 performs control so that the function corresponding to the selected icon will be executed.

The icon is a design pattern displayed on an operation screen and used for starting a specific application program (hereinafter called "an app") or indicating an operation position for shifting to a specific screen. This design pattern includes a pictorial design and may also include various characters, such as alphabets, Hiragana (Japanese syllabary), Katakana (another Japanese syllabary), and Chinese characters.

Icons displayed on the screen of the display 32 include basic icons and related icons. A basic icon is an icon used for starting a program or an app for executing a basic function of the image forming device 10, such as copying, scanning, fax sending, device setting, and authentication setting. A related icon is an icon generated by a user in relation to a basic icon.

One of the related icons is an icon called a one touch app icon. The one touch app icon is an icon for executing an application program called a one touch app.

The one touch app is an application program for executing processing, assuming that various instructions have been received at one time as a result of a user selecting a corresponding icon. Examples of the various instructions are: (1) operation such as copying, scanning, and fax sending; (2) various settings, such as the number of copies, single-sided/double-sided, color/monochrome, data storage location, and fax sending destination; and (3) a processing start instruction (start button).

The one touch app is processing execution data for executing specified processing when a corresponding icon is selected. When a one touch app is selected as a result of a user touching a corresponding one touch app icon, the controller 31 controls execution units, such as the storage unit 33, the image reader 35, the image output unit 38, and the communication unit 37 so that processing will be executed with settings set in the selected one touch app.

In principle, when a one touch app is selected, it is immediately executed, assuming that a processing start instruction has been received. Accordingly, in principle, values and settings which are set when a one touch app is created are not possible to change afterwards.

If a user wishes to change set values or settings after creating a one touch app, the user is required to delete this one touch app and create a new one with new settings.

Additionally, even if a one touch app can be executed without any error when it is created, if the state of the device is changed afterwards, an error may occur when the one touch app is selected and executed, or the one touch app may not be executed at all. For example, after a one touch app for performing operations including stapling has been created, if a post-processor for performing stapling is removed from the device, stapling is not performed when the one touch app is executed. After a one touch app for performing operations including color printing has been created, if color toner runs out, an error occurs and color printing is not performed when the one touch app is executed.

To deal with the above-described situations, if a certain setting set in a one touch app is changed because of a state change in the device, the one touch app is not immediately executed when it is selected by a user, and instead, the user is informed that a certain setting has been changed.

On the other hand, however, if the user is informed of every minor change in a setting, such as a setting which may be unimportant for the user, the user has to perform an additional operation to continue the execution of a one touch app every time it receives such information, and may not be able to find any merit in creating a one touch app.

To address this issue, in the image forming device 10 in this exemplary embodiment, the operation input unit 34 receives in advance from a user an item of a setting for which the user accepts that the setting will be changed among items of settings set in a one touch app.

If a state change detected by the state detector 36 is a change concerning an item of a setting for which a user accepts that the setting will be changed, the controller 31 controls the operation input unit 34 so that the setting of the item will be changed and then execution of processing of a one touch app will be accepted. "Controlling the operation input unit 34 so that the setting of the item will be changed and then execution of processing of a one touch app will be accepted" refers to that, when the one touch app is selected, the operation of the one touch app is changed so that a predetermined value or setting set in the one touch app will be changed at least for this operation and also that information that the predetermined value or setting has been changed will be displayed for a user. A timing at which such information is displayed may be before the one touch app is selected or after the one touch app is selected but before processing is executed or while the processing is executed.

If the state change detected by the state detector 36 is a change concerning an item of a setting for which the user does not accept that the setting will be changed, the controller 31 controls the operation input unit 34 so that execution of the processing of the one touch app will not be accepted.

More specifically, the controller 31 displays on the display 32 an icon corresponding to this one touch app such that the icon is not selectable.

If the state change detected by the state detector 36 is a change concerning an item of a setting for which the user does not accept that the setting will be changed, the controller 31 displays on the display 32 a checking screen for the user indicating the content of changing of the setting before starting to execute the processing of the one touch app selected by the user.

Then, if the user cancels the execution of the one touch app on the checking screen, the controller 31 asks the user whether to delete the one touch app. If the user selects deletion of the one touch app, the controller deletes the one touch app.

If an error occurs while a one touch app is being executed, the controller 31 may ask the user whether to delete the one touch app. If the user selects deletion of the one touch app, the controller 31 may delete the one touch app.

If the controller 31 controls the operation input unit 34 so that an item of a setting for which the user accepts that the setting will be changed will be changed and then execution of the processing of the one touch app will be accepted, it displays on the display 32 an icon corresponding to this one touch app so as to allow the user to understand that a certain setting set in the one touch app has been changed.

After starting to execute the processing of the one touch app, the controller 31 displays on the display 32 information that the processing of the one touch app is being executed after a certain setting set in the one touch app has been changed. In this case, the controller 31 also displays on the display 32 an item of a setting for which the setting has been changed.

This exemplary embodiment will discuss a one touch app for executing processing with preset settings when a corresponding icon on the display 32 is selected. However, an exemplary embodiment of the invention may be applied to any type of processing execution data that executes processing with preset settings when it is selected, such as processing execution data which is not immediately started, unlike a one touch app which is immediately started when an associated icon is pressed. That is, such processing execution data does not include the function of a start button. An example of such processing is a job flow for sequentially executing multiple operations with preset settings, such as reading an image and then optically reading characters and storing read image data and optically read character data in a predetermined storage location as a single item of data. Another example of such processing is a job memory such that information that copying is performed with color and double-sided settings is stored in an icon.

Operations executed by the image forming device 10 will be described below in detail with reference to the drawings.

Figure 4:
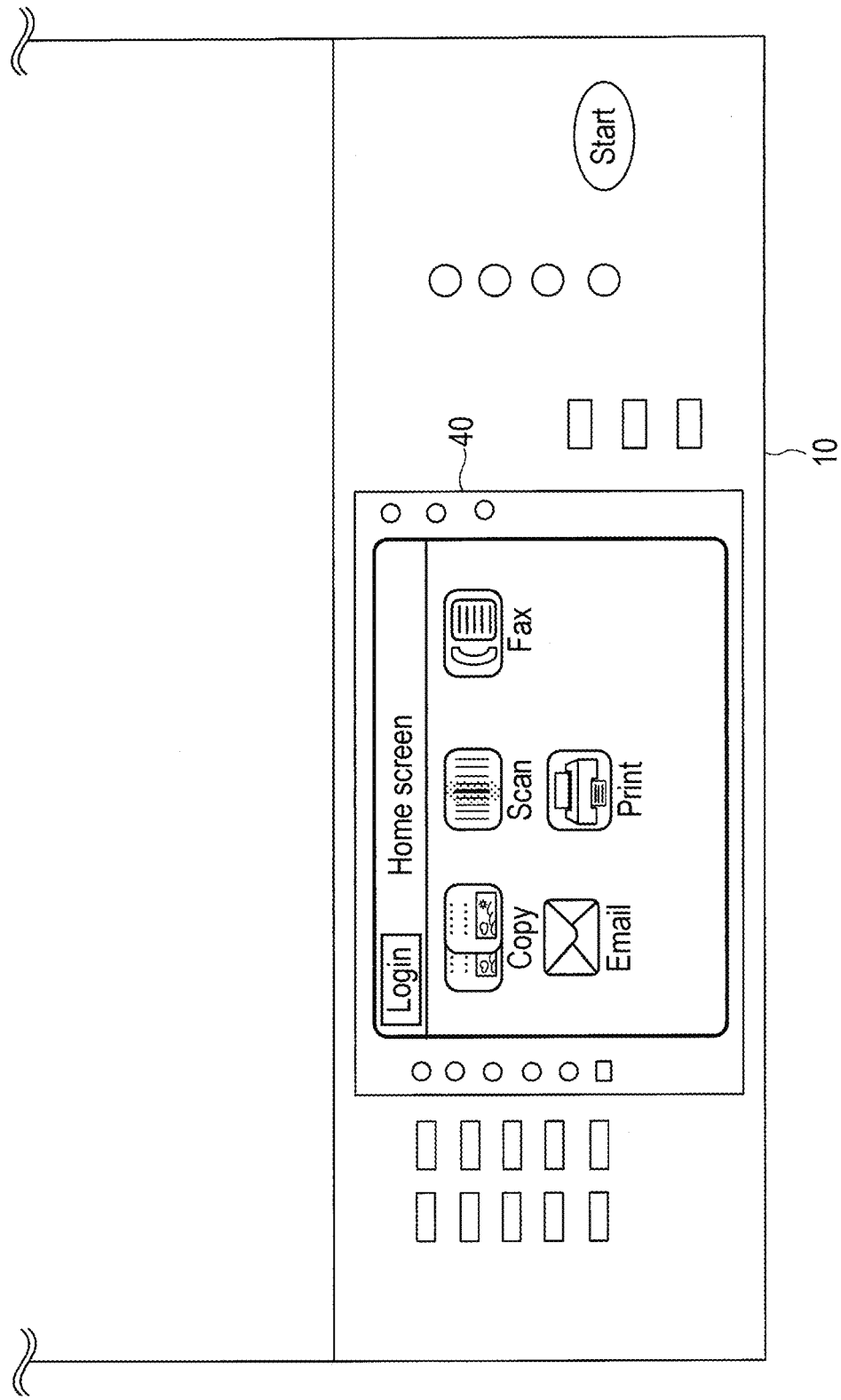
FIG. 4 illustrates an example of a display screen of an operation panel of the image forming device.

An example of the display content of an operation panel 40 of the image forming device 10 is shown in FIG. 4. The operation panel 40 is a touch panel, and serves both as the display 32 and the operation input unit 34.

Figure 5:
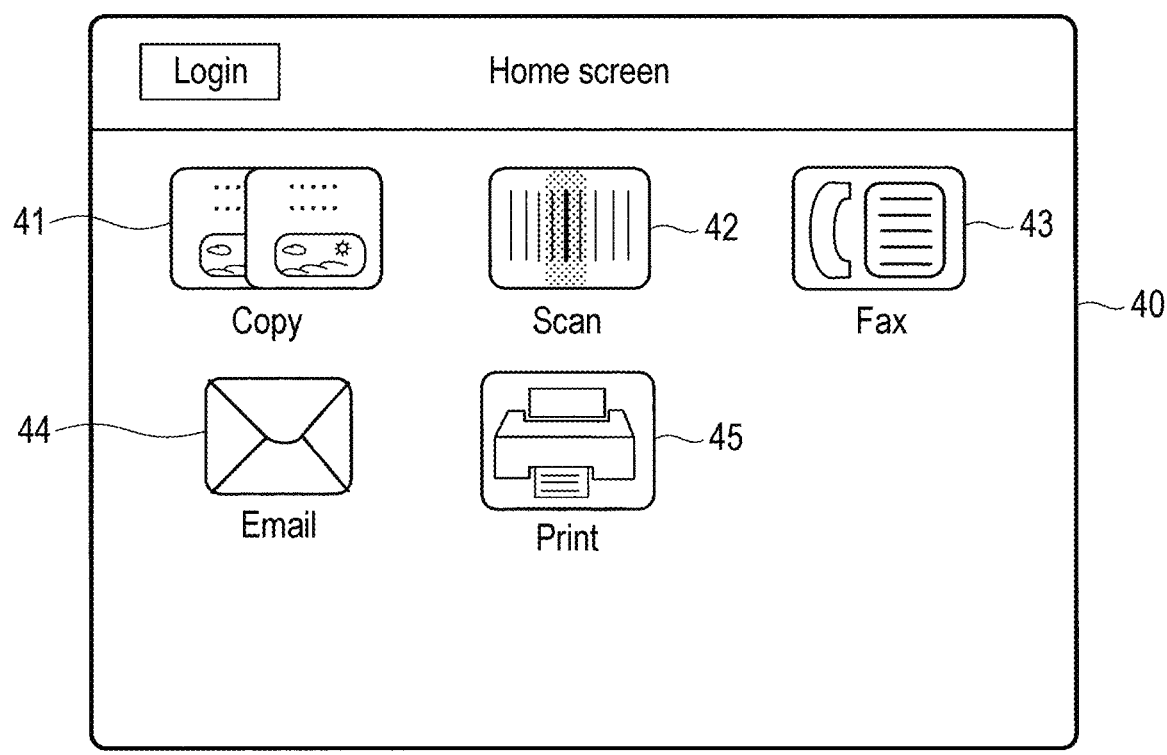
FIG. 5 is an enlarged view of the display content of a home screen when the image forming device is in a standby state.

In FIG. 4, a home screen when the image forming device 10 is in the standby state is displayed on the operation panel 40. FIG. 5 is an enlarged view of the display content of this home screen.

In the example of the home screen shown in FIG. 5, plural icons 41 through 45 for executing certain functions are displayed on the operation screen of the operation panel 40.

For example, the icon 41 is an icon for executing a copy function. As a result of a user touching the icon 41 with a finger, a copy application program is started so that the user can use the copy function.

The icon 42 is an icon for executing a scan function. The icon 43 is an icon for executing a fax function. The icon 44 is an icon for executing an email sending-and-receiving function. The icon 45 is an icon for executing a printer setting function.

The icons 41 through 45 shown in FIG. 5 are basic icons for executing basic functions of the image forming device 10. The image forming device 10 can generate a one touch app for executing a function customized for a user.

Figure 6:
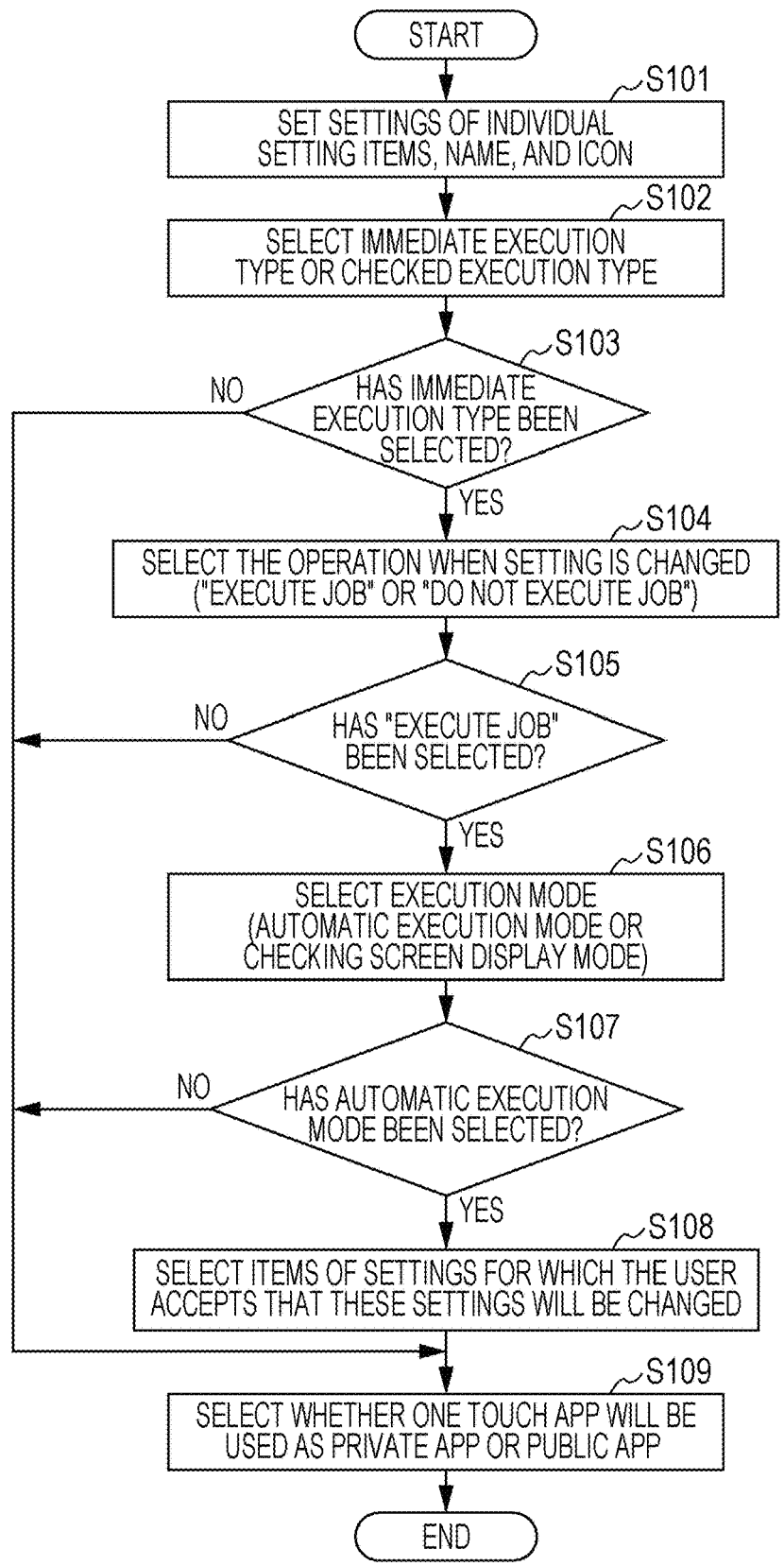
FIG. 6 is a flowchart illustrating an operation executed by the image forming device when registering (creating) a one touch app.

An operation executed by the image forming device 10 when registering (creating) a one touch app will be described below with reference to the flowchart of FIG. 6.

Figure 7:
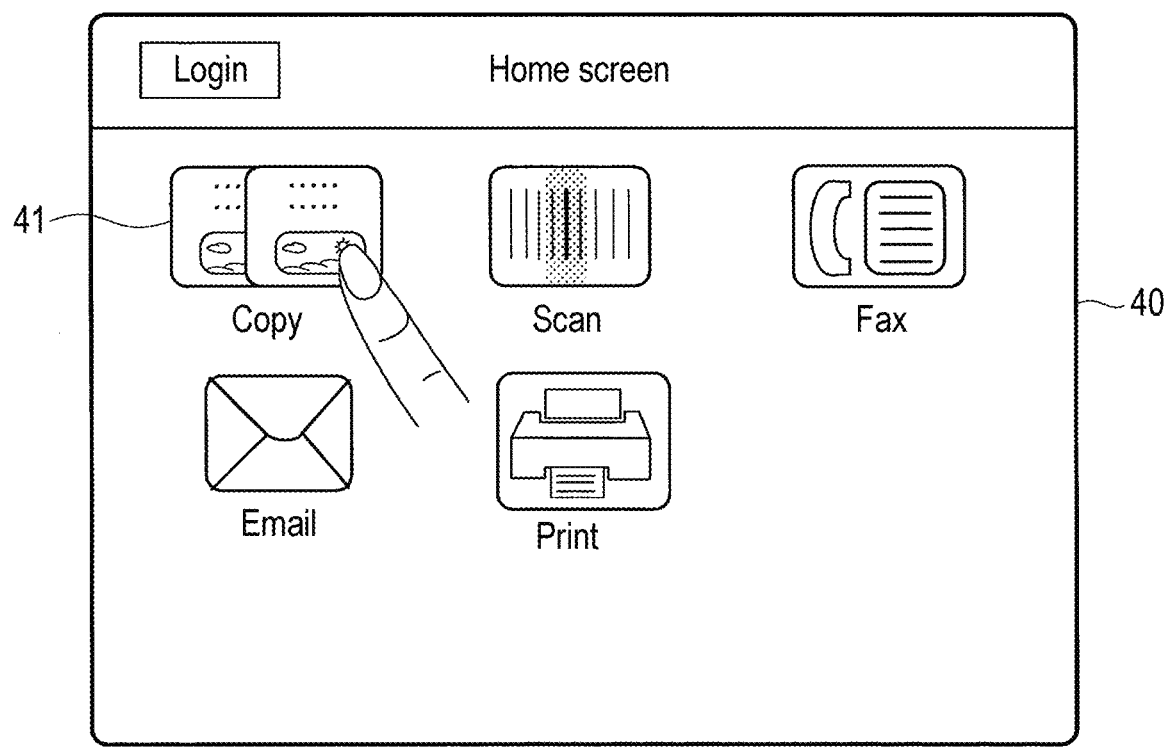

In step S101, a user selects an icon of a basic function based on which the user wishes to create a one touch app, and sets settings of individual setting items and selects an icon and a name of the one touch app. It is assumed that the user has selected the icon 41 corresponding to the copy function, as shown in FIG. 7.

Figure 8:
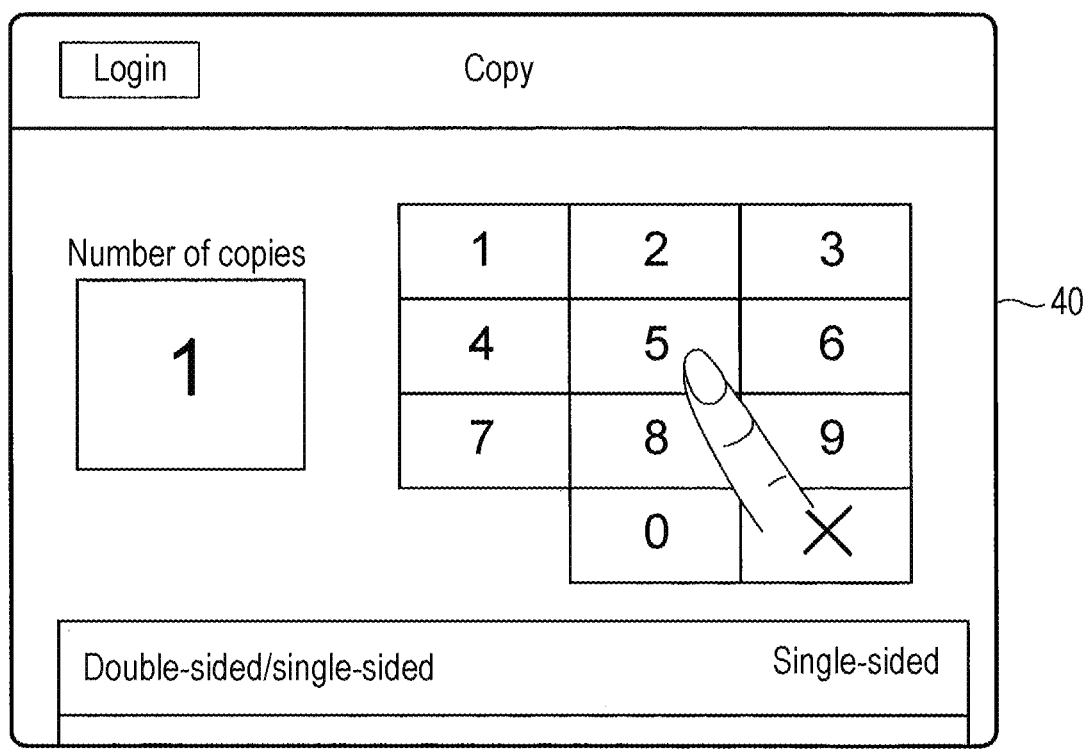
Figure 9:
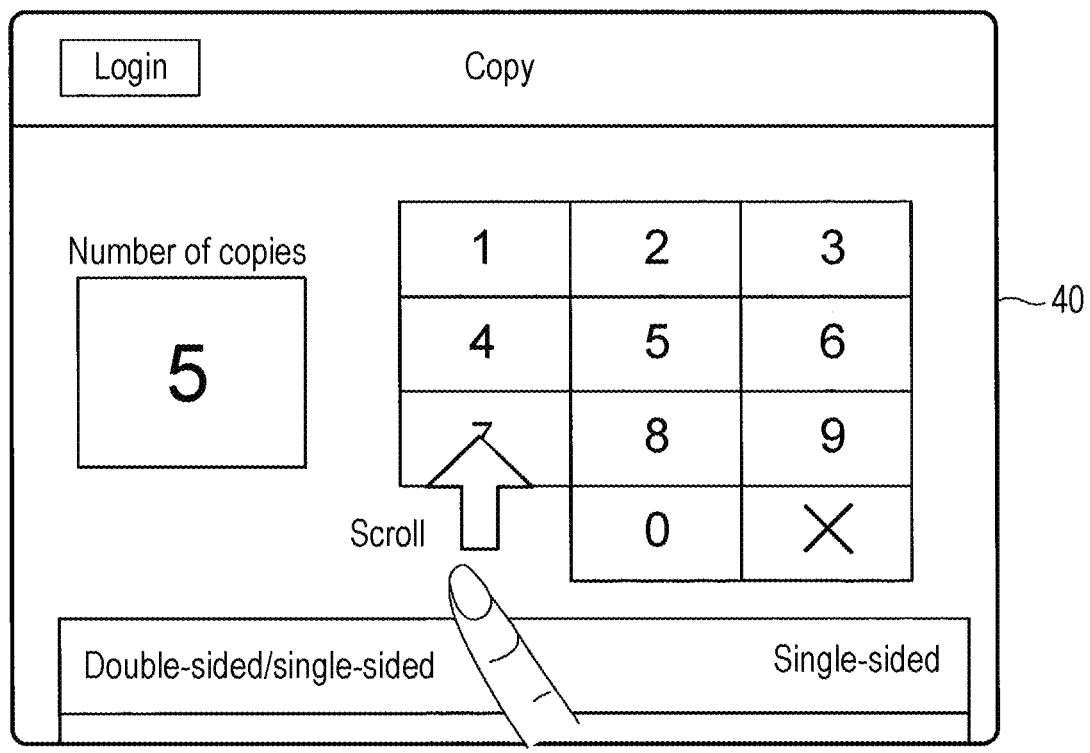

As a result of the user selecting the icon 41 corresponding to the copy function, a screen for inputting values and setting settings of various setting items of the copy function, such as that shown in FIG. 8, is displayed. In FIG. 8, the user inputs "5" as the number of copies.

This operation screen includes display areas for inputting values and setting settings of various other setting items than this setting item (the number of copies). The user thus scrolls up on the display screen of the operation panel 40 with a finger so as to display the display area for another setting item downward.

Figure 10:
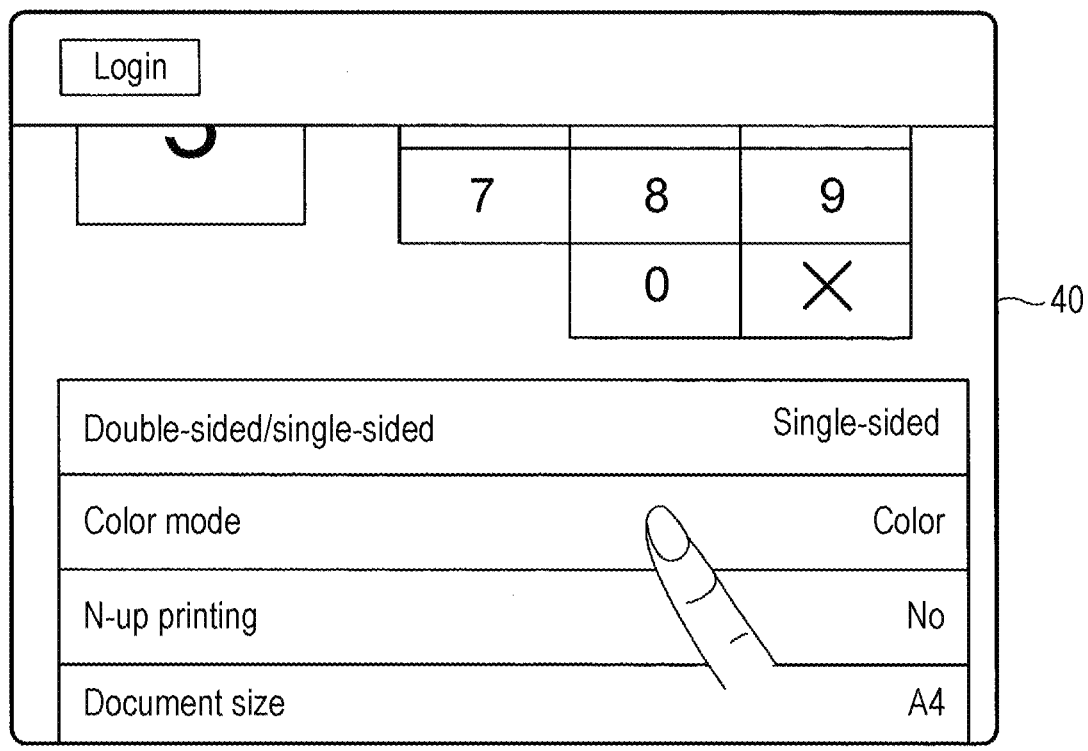

Then, as shown in FIG. 10, the user selects another setting item other than the number of copies so as to set a value or setting to be registered in a one touch app.

Figure 11:
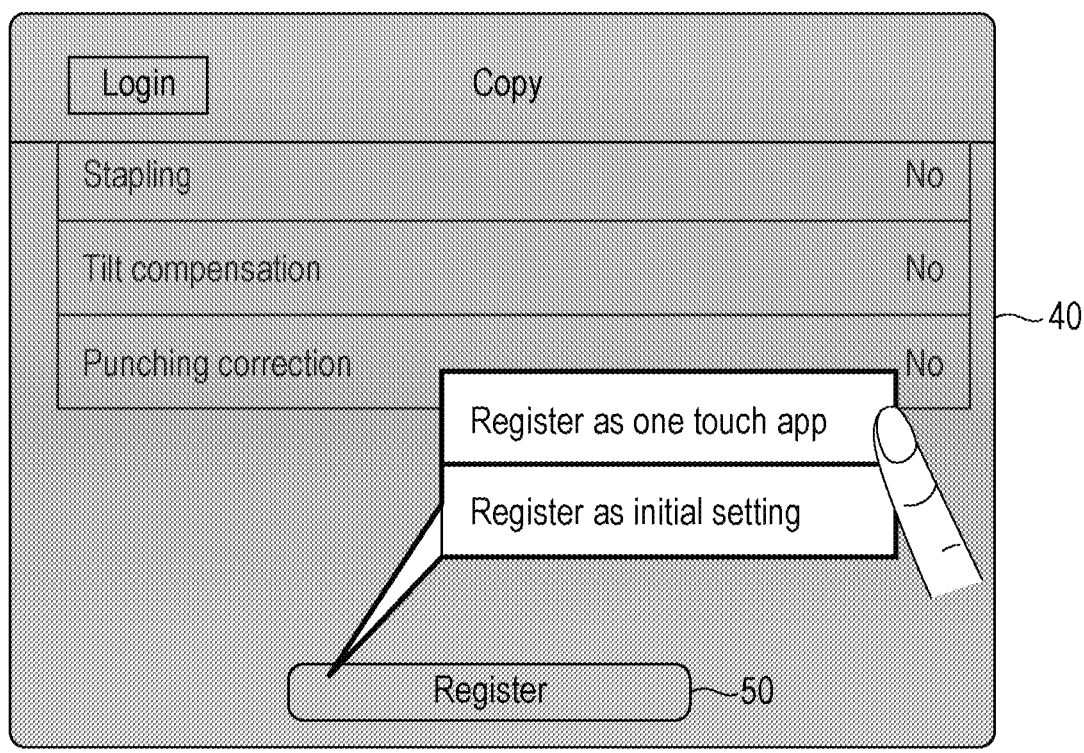

After setting various values and settings in this manner, when the user taps a register button 50 indicating "Register", as shown in FIG. 11, a popup screen for selecting the registration purpose of the set values and settings appears. In this case, the user intends to generate a one touch app, and thus selects an option "Register as one touch app".

Figure 12B:
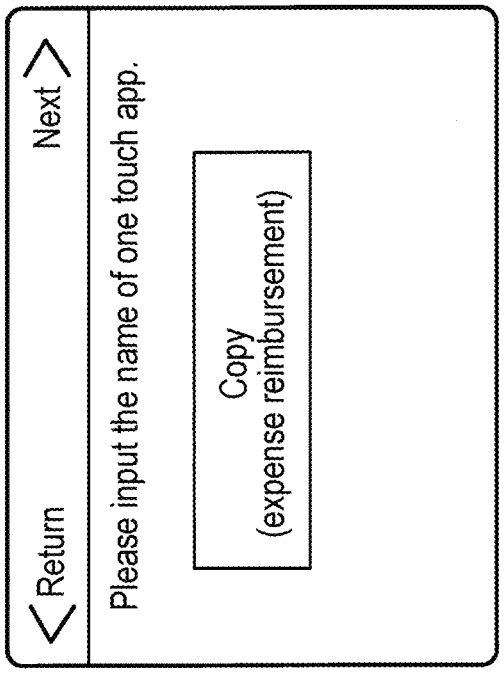
Figure 12A:
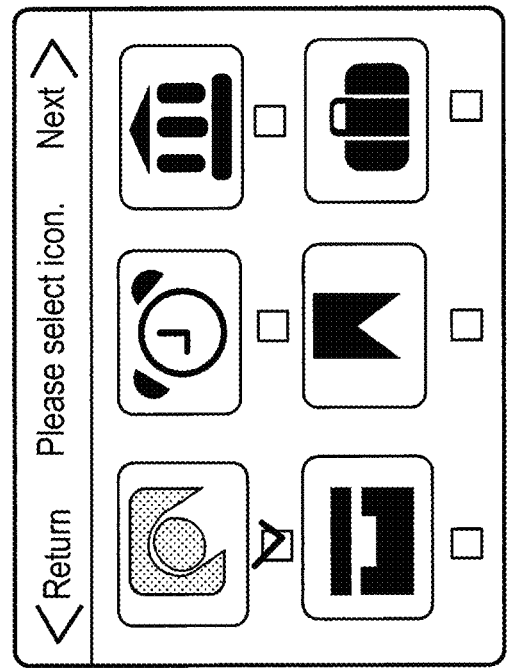

Then, as shown in FIG. 12A, a selection screen for selecting the design of an icon is displayed on the operation panel 40. On this selection screen, the user may select a design of a one touch app icon as the user wishes. After selecting the design of the one touch app icon, a screen for inputting the name of the one touch app is displayed on the operation panel 40, as shown in FIG. 12B. In the example in FIG. 12B, the user has input "Copy (expense reimbursement)" as the name of the one touch app.

Figure 13:
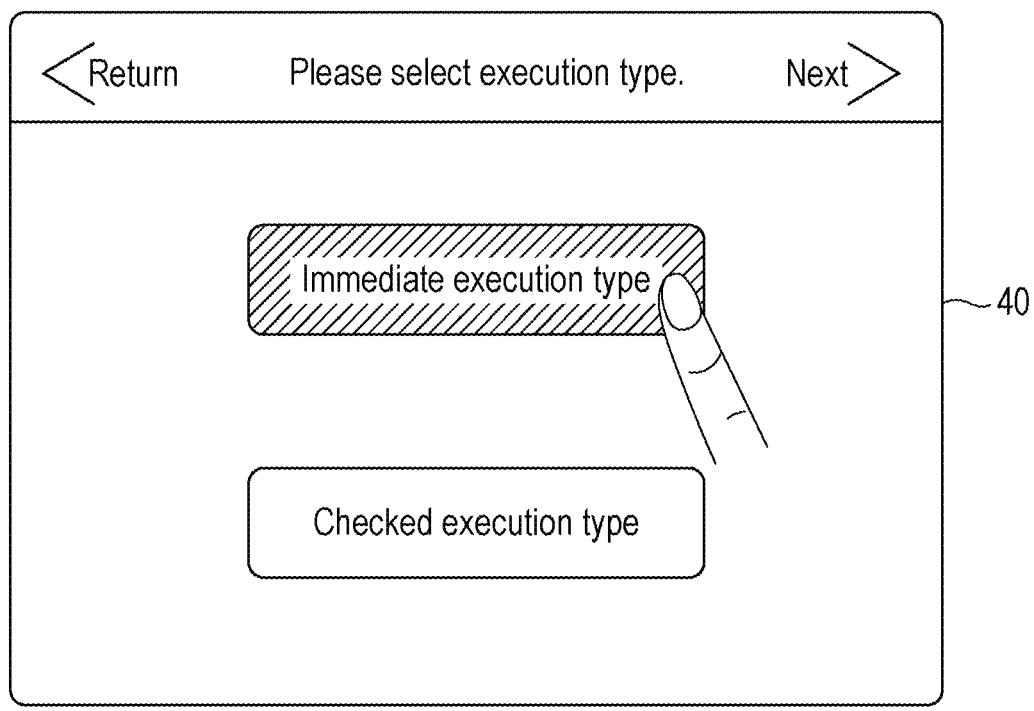

After selecting the design of the icon and the name of the one touch app, in step S102, the user selects the execution type of the one touch app, as shown in FIG. 13. As the execution type, the user selects an immediate execution type or a checked execution type. The immediate execution type is the following execution type. When a one touch app icon is selected, the associated one touch app is immediately started and executed. The checked execution type is the following execution type. When a one touch app icon is selected, the associated one touch app is not immediately started, but a checking screen is displayed for the user selected the one touch app icon. When the user has given an instruction to start the one touch app, the one touch app is started.

In the example in FIG. 13, the user has selected the immediate execution type.

Figure 14:
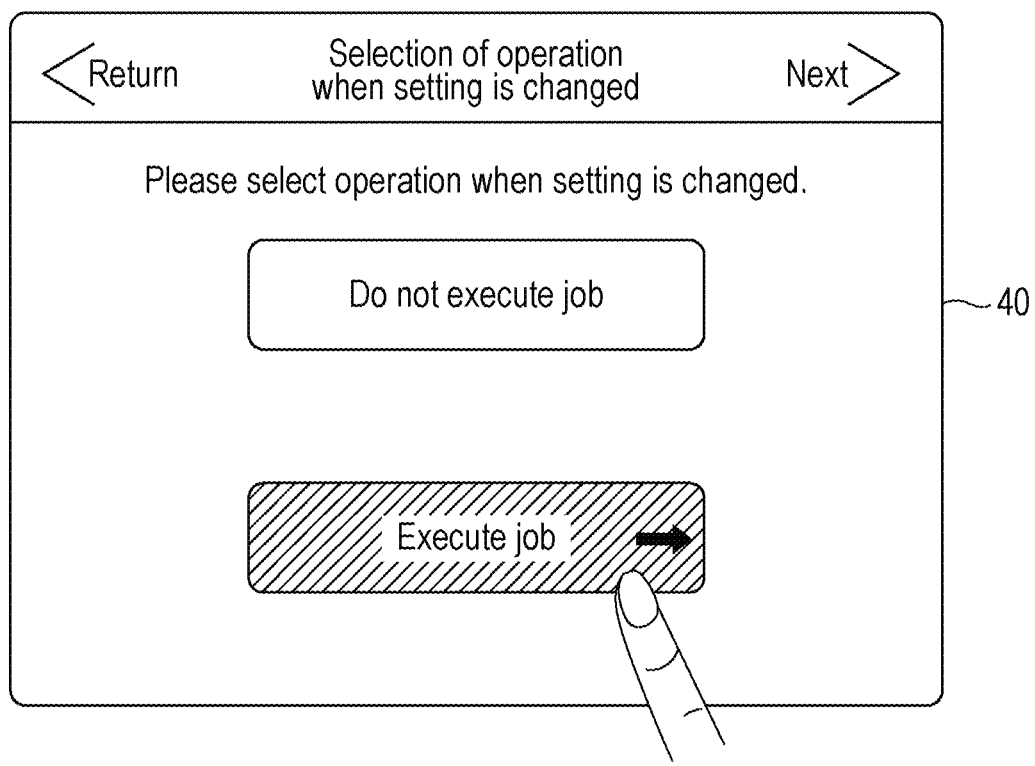

If the immediate execution type is selected (YES in step S103), a screen, such as that shown in FIG. 14, is displayed on the operation panel 40, and the operation to be executed when a certain setting is changed is selected in step S104. More specifically, the user is instructed to select one of the two options "Do not execute job" and "Execute job" on the operation panel 40. "Do not execute job" means that the one touch app will not be executed when a certain setting is changed. "Execute job" means that the one touch app will be executed even when a certain setting is changed if a predetermined condition is satisfied.

In the example in FIG. 14, the user has selected "Execute job". If "Execute job" is selected (YES in step S105), a screen for selecting the execution mode when a setting is changed, such as that shown in FIG. 15, is displayed on the operation panel 40 in step S106.

Figure 15:
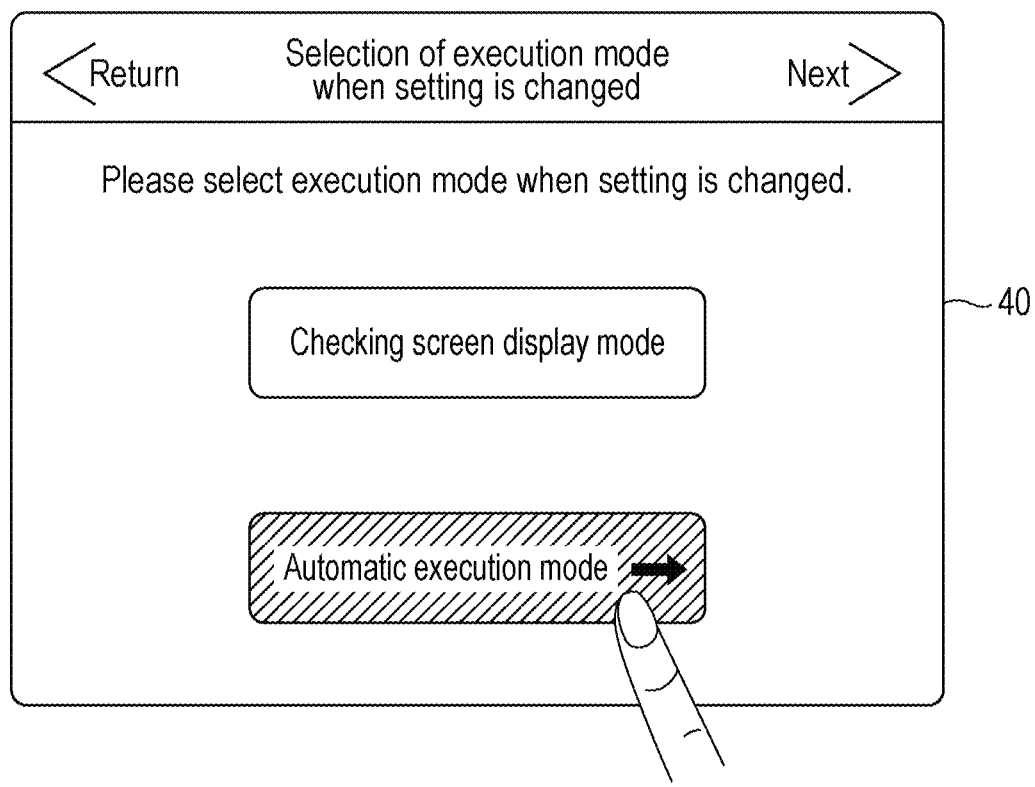

On the screen shown in FIG. 15, "Checking screen display mode" and "Automatic execution mode" are displayed. The checking screen display mode is the following execution mode. When a one touch app is selected and a certain setting set in the one touch app has been changed, a checking screen is displayed for a user and the one touch app is executed after the user has agreed to execute the one touch app on the checking screen. The automatic execution mode is the following execution mode. When a one touch app is selected and a certain setting set in the one touch app has been changed, the one touch app is executed without displaying the checking screen if the user has already accepted that this setting would be changed.

Figure 16:
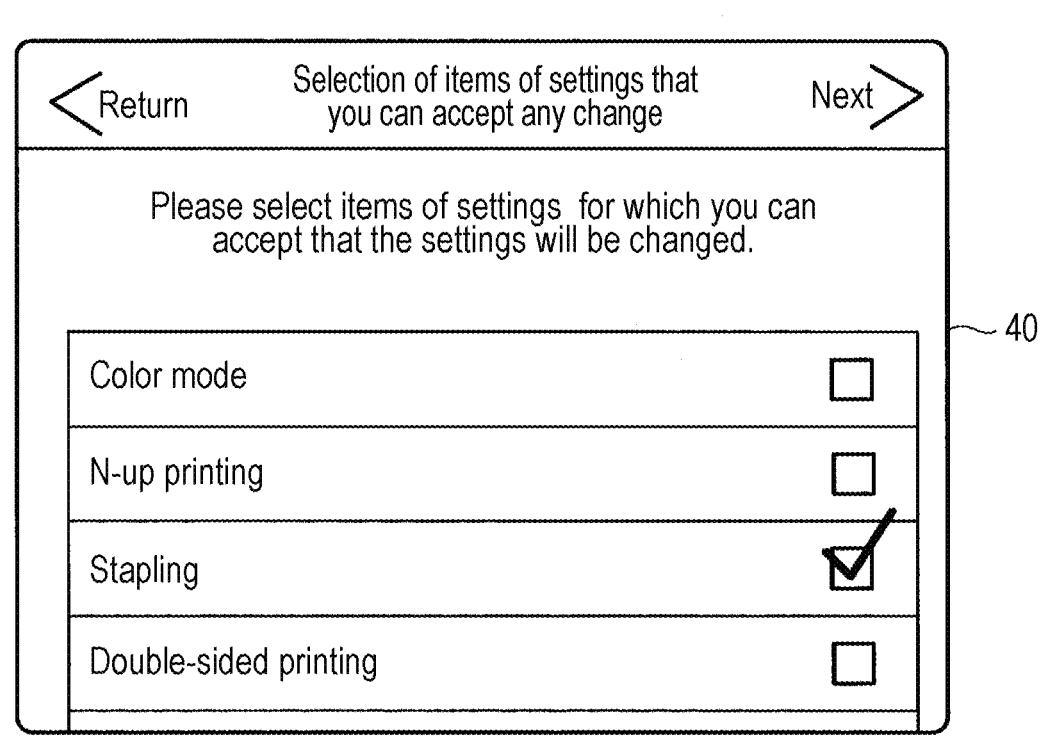

In the example in FIG. 15, the user has selected the automatic execution mode. If the automatic execution mode is selected (YES in step S107), in step S108, a selection screen for selecting items of settings for which the user accepts that these settings will be changed is displayed on the operation panel 40, as shown in FIG. 16.

On this selection screen, the user selects, among items of settings set in the one touch app, items of settings for which the user accepts that these settings will be changed and agrees that the one touch app will be automatically executed without checking with the user. Hereinafter, such items of settings selected by the user will be called "items of settings accepted by the user".

Figure 17:
FIG. 17 illustrates a display screen for explaining examples of items of settings for which a user accepts that these settings will be changed.

Examples of items of settings accepted by the user are shown in FIG. 17. In FIG. 17, the user has selected "stapling", "double-sided printing", and "punching". That is, if the user has made selection as shown in FIG. 17, even if the execution of stapling, double-sided printing, or punching fails due to a state change in the image forming device 10, the one touch app can be automatically started without checking with the user. Items of settings other than those selected by the user are not items of settings accepted by the user.

Then, in step S109, the user selects whether the one touch app will be used as a private app or a public app. The private app is an app that can be used only by the creator user. The public app is an app that can be used by users other than the creator user.

Figure 18:
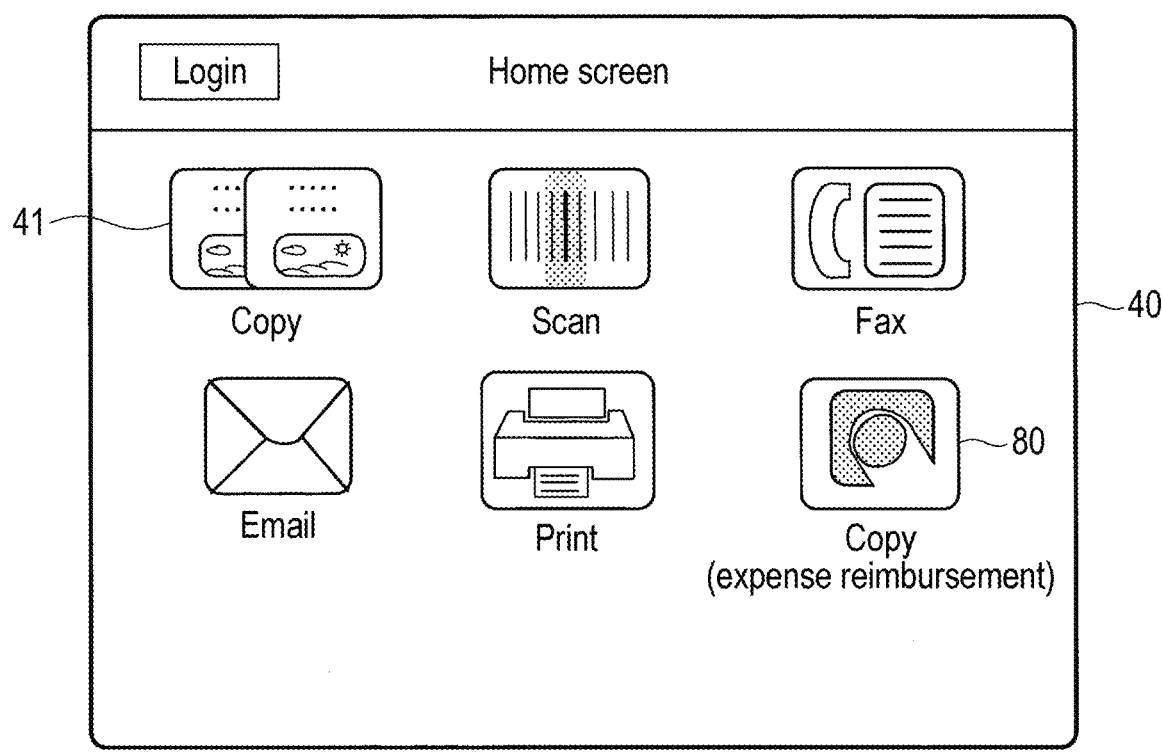
FIG. 18 illustrates an example of a home screen after a one touch app has been created.

When a one touch app has been generated through the steps discussed with reference to FIGS. 7 through 17, a one touch app icon 80 corresponding to the generated one touch app is added on the operation screen of the operation panel 40, as shown in FIG. 18.

As a result of the user selecting the one touch app icon 80, the copy function based on the settings and values set by the user is executed. In this manner, by registering frequently used settings and values as a one touch app, the user can execute processing with fewer operations.

Figure 19:
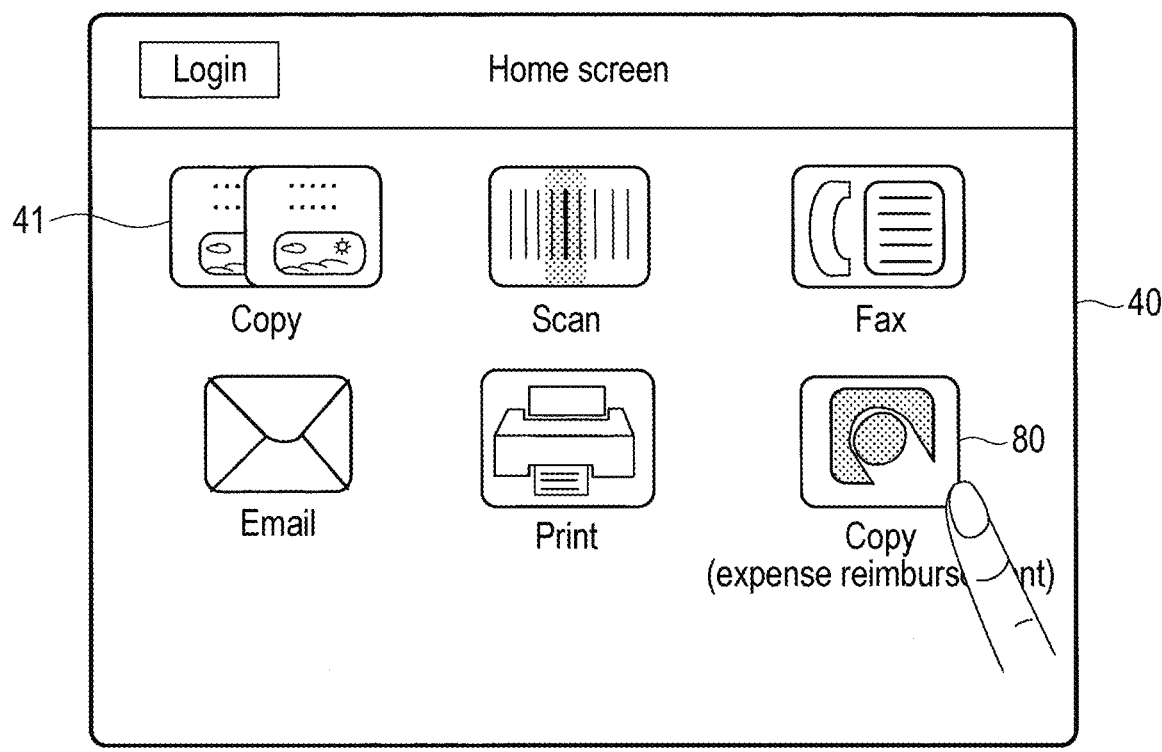
FIG. 19 illustrates a state in which a one touch app icon displayed on the operation panel is tapped and selected.

An operation executed by the image forming device 10 when the one touch app icon 80 is tapped, as shown in FIG. 19, will be described below.

Figure 20:
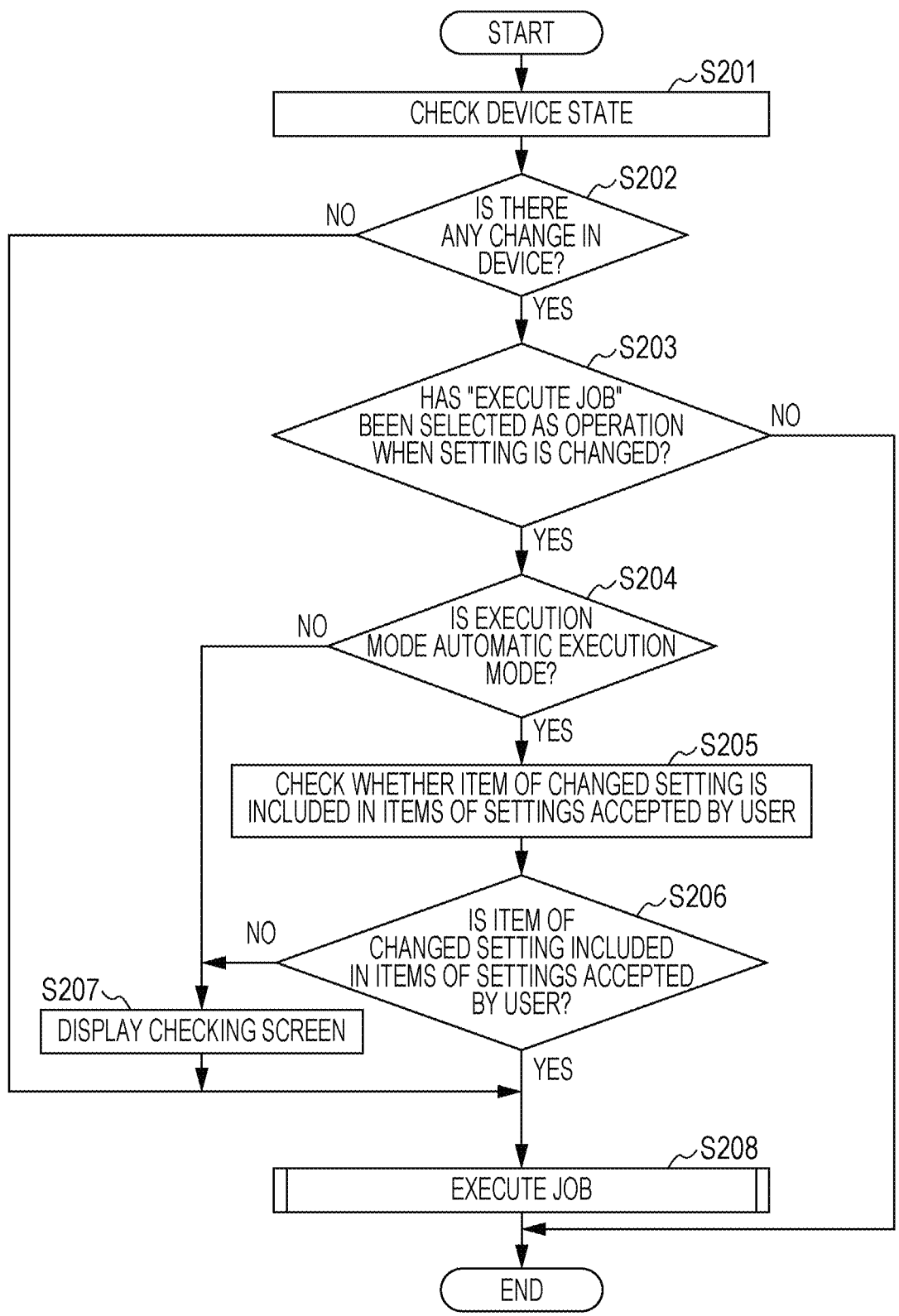
FIG. 20 is a flowchart illustrating an operation executed by the image forming device when the execution type of a selected one touch app icon is an immediate execution type.

The operation to be executed when the execution type of the one touch app icon 80 is the immediate execution type will be described below with reference to the flowchart of FIG. 20.

When the one touch app is selected, the state detector 36 checks the state of the image forming device 10 and detects any change in the state in step S201.

If the controller 31 determines based on the detection result of the state detector 36 that the state of the image forming device 10 has not changed (NO in step S202), it executes the job based on the selected one touch app in step S208.

If the controller 31 determines based on the detection result of the state detector 36 that the state of the image forming device 10 has changed (YES in step S202), it determines in step S203 whether "Execute job" has been selected for this one touch app as the operation when a setting is changed.

If "Do not execute job" has been selected for the one touch app (NO in step S203), the controller 31 terminates the processing without executing the one touch app.

If "Execute job" has been selected for the one touch app (YES in step S203), the controller 31 determines in step S204 whether the execution mode of the one touch app is the automatic execution mode.

If the execution mode of the one touch app is not the automatic execution mode, that is, it is the checking screen display mode (NO in step S204), the controller 31 displays on the operation panel 40 a checking screen for checking with the user whether to start executing the one touch app in step S207.

Figure 21:
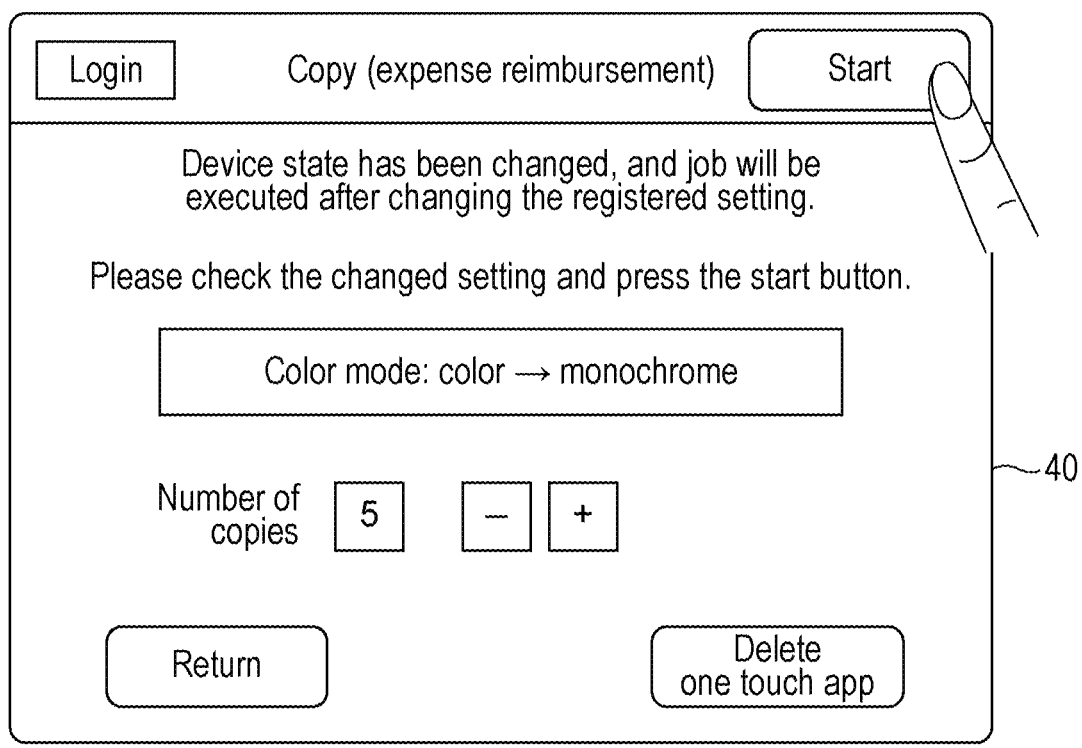
FIG. 21 illustrates an example of a checking screen to be displayed when a one touch app icon is selected.

An example of the checking screen is shown in FIG. 21. In FIG. 21, the checking screen shows that the color mode has been changed from color to monochrome, and asks the user whether to start copying in the changed color mode.

If the user has chosen to execute the one touch app after checking that the setting has been changed on the checking screen shown in FIG. 21 and presses the start button, the job based on the one touch app is executed in step S208.

Figure 22:
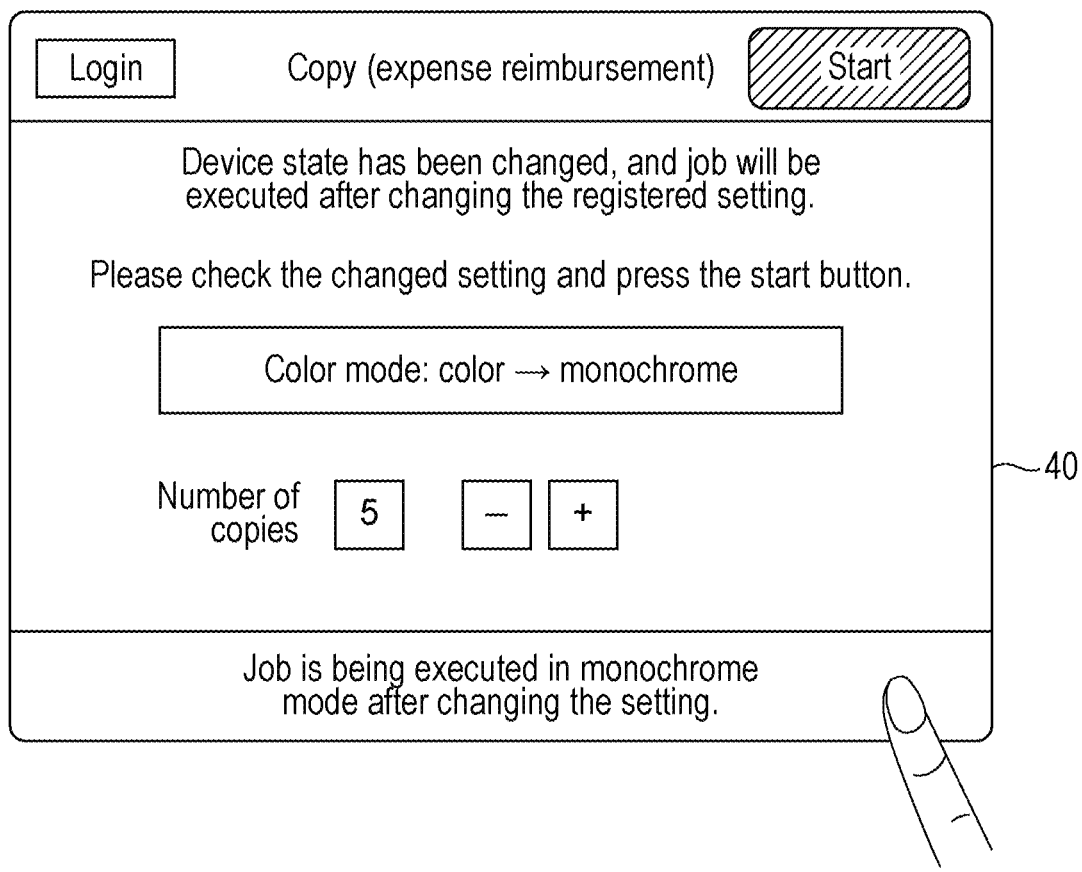
FIG. 22 illustrates an example of a display screen when a user has checked on the checking screen shown in FIG. 21 that a setting has been changed and pressed a start button.

An example of the screen when the job based on the one touch app is executed is shown in FIG. 22. In the example in FIG. 22, a message "Job is being executed in the monochrome mode" is displayed as a banner, so that the user can understand that the job is being executed after changing the setting.

If the execution mode of the one touch app is the automatic execution mode (YES in step S204), the controller 31 checks in step S205 whether the item of the changed setting is included in the items of settings accepted by the user.

If the item of the changed setting is not included in the items of settings accepted by the user (NO in step S206), in step S207, the controller 31 displays a checking screen, such as that shown in FIG. 21, to inform the user that a certain setting has been changed and to check with the user whether to start executing the one touch app with the changed setting.

Figure 23:
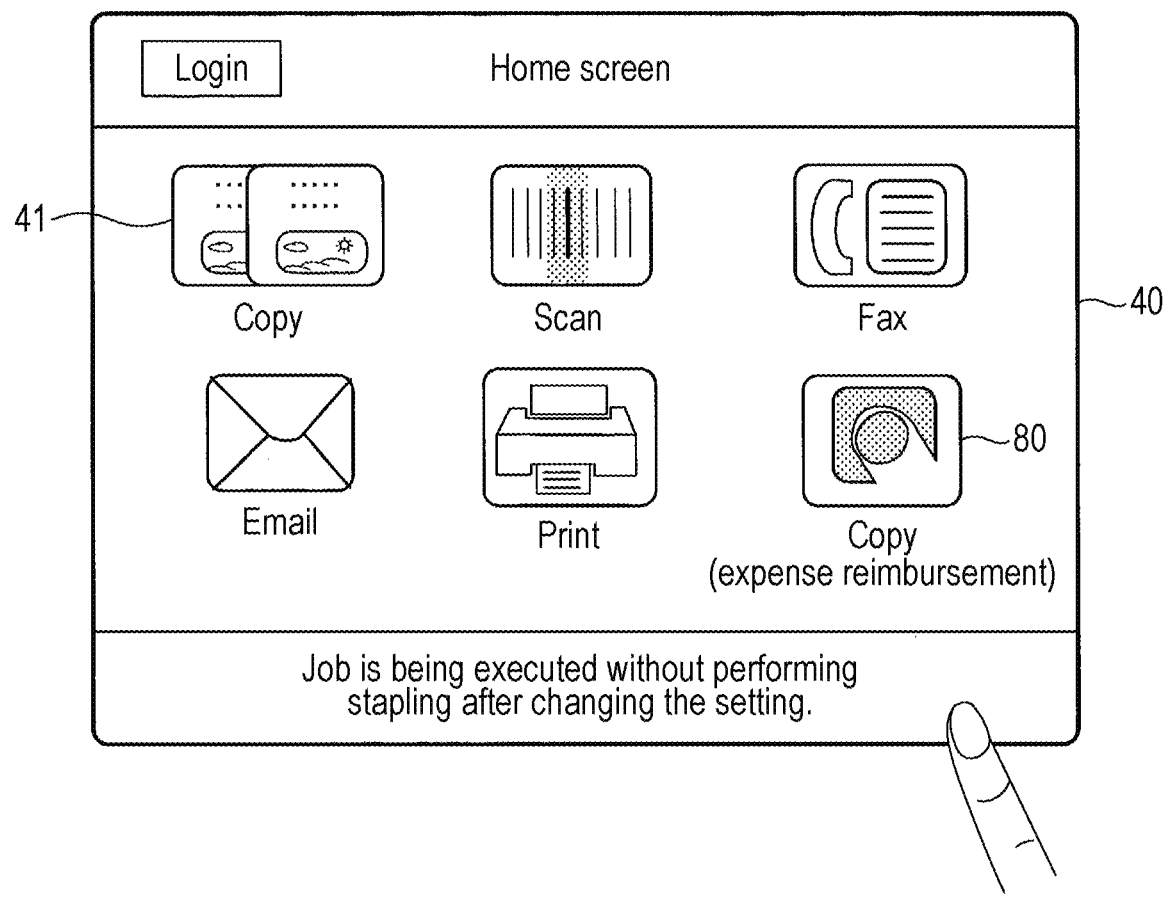
FIG. 23 illustrates an example of a display screen when a job based on a selected one touch app is executed without displaying a checking screen.

If the item of the changed setting is included in the items of settings accepted by the user (YES in step S206), the job based on the one touch app is executed in step S208, as shown in FIG. 23, without displaying a checking screen, such as that shown in FIG. 21.

FIG. 23 shows an example of the display screen when an item of a setting accepted by the user is stapling. In FIG. 23, the display screen shows as a banner that the one touch app is being executed without performing stapling.

Figure 24:
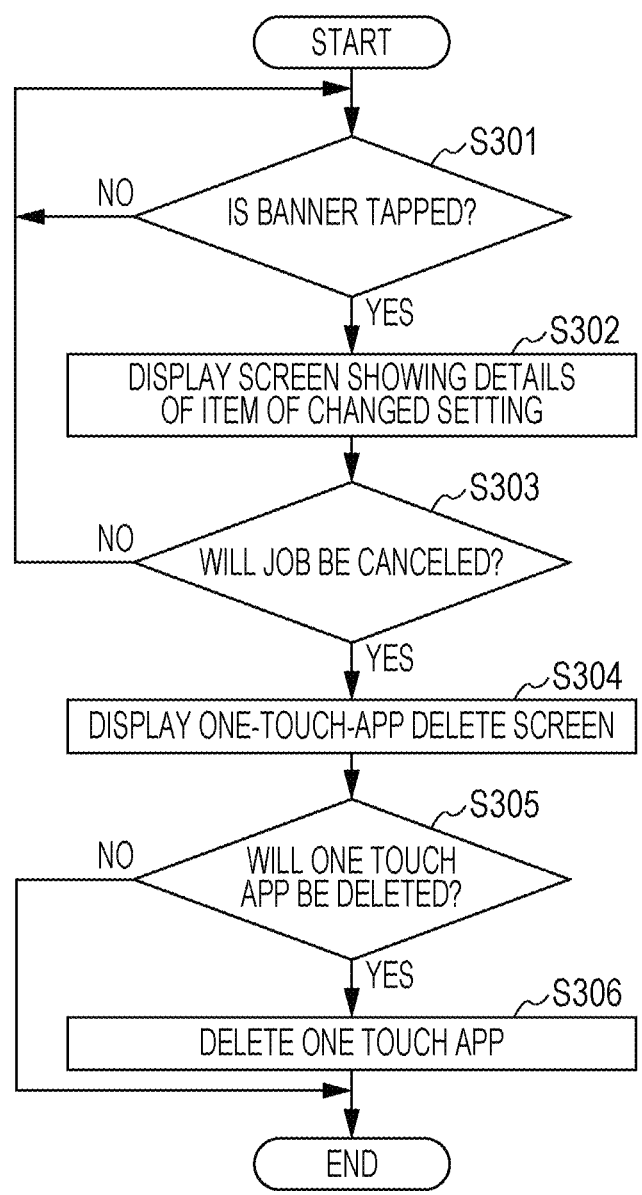
FIG. 24 is a flowchart illustrating an operation executed by the image forming device when a banner is tapped while a job is being executed.

An operation executed by the image forming device 10 when a banner is tapped while a job is being executed in the example of the display screen shown in FIG. 22 or 23 will be described below with reference to the flowchart of FIG. 24.

The controller 31 determines in step S301 whether a banner has been tapped. If the banner is tapped (YES in step S301), the controller 31 displays a screen, such as that shown in FIG. 25, to show details of the changed setting in step S302.

Figure 25:
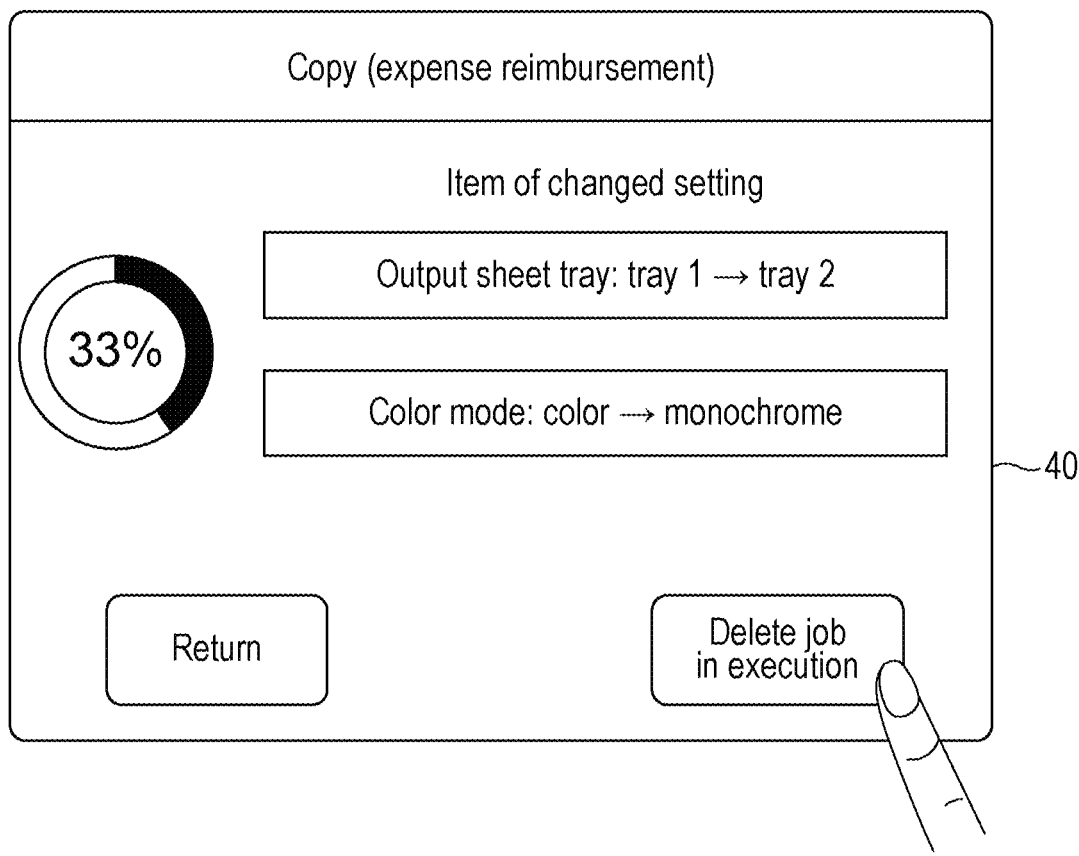
FIG. 25 illustrates an example of a display screen on the operation panel showing details of items of settings which have been changed.

In the example of the display screen shown in FIG. 25, details of the changed settings are displayed together with the progress status of a current job. In FIG. 25, the job is being executed after two items of settings "Output sheet tray" and "Color mode" have been changed.

Figure 26:
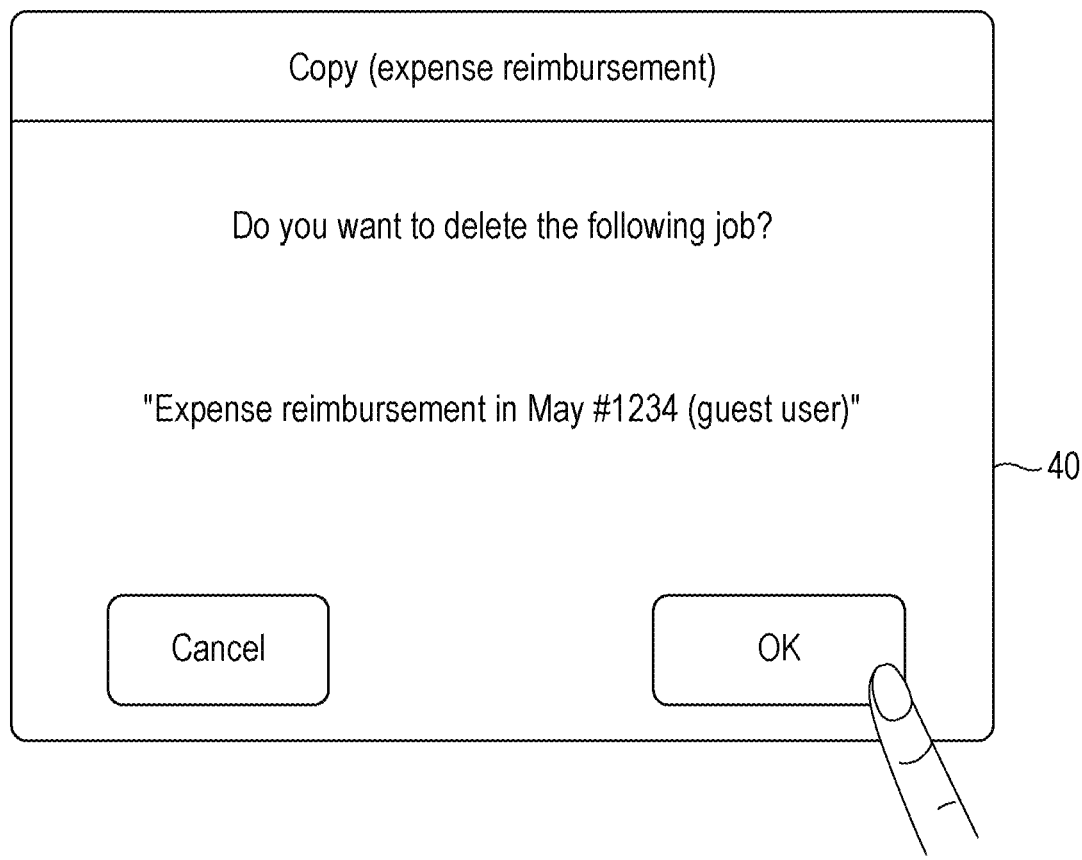
FIG. 26 illustrates an example of a delete checking screen for a job displayed on the operation panel.

If the user wishes to cancel the job after checking the display screen shown in FIG. 25 because the user does not want the output result with the settings indicated in FIG. 25, the user touches a "Delete job in execution" button. Then, the controller 31 displays a job delete checking screen, such as that shown in FIG. 26, and checks with the user whether to delete the job. If the user touches an "OK" button to give an instruction to delete the job (YES in step S303), the controller 31 cancels the job and also displays a checking screen for deleting a one touch app, such as that shown in FIG. 27, in step S304.

Figure 27:
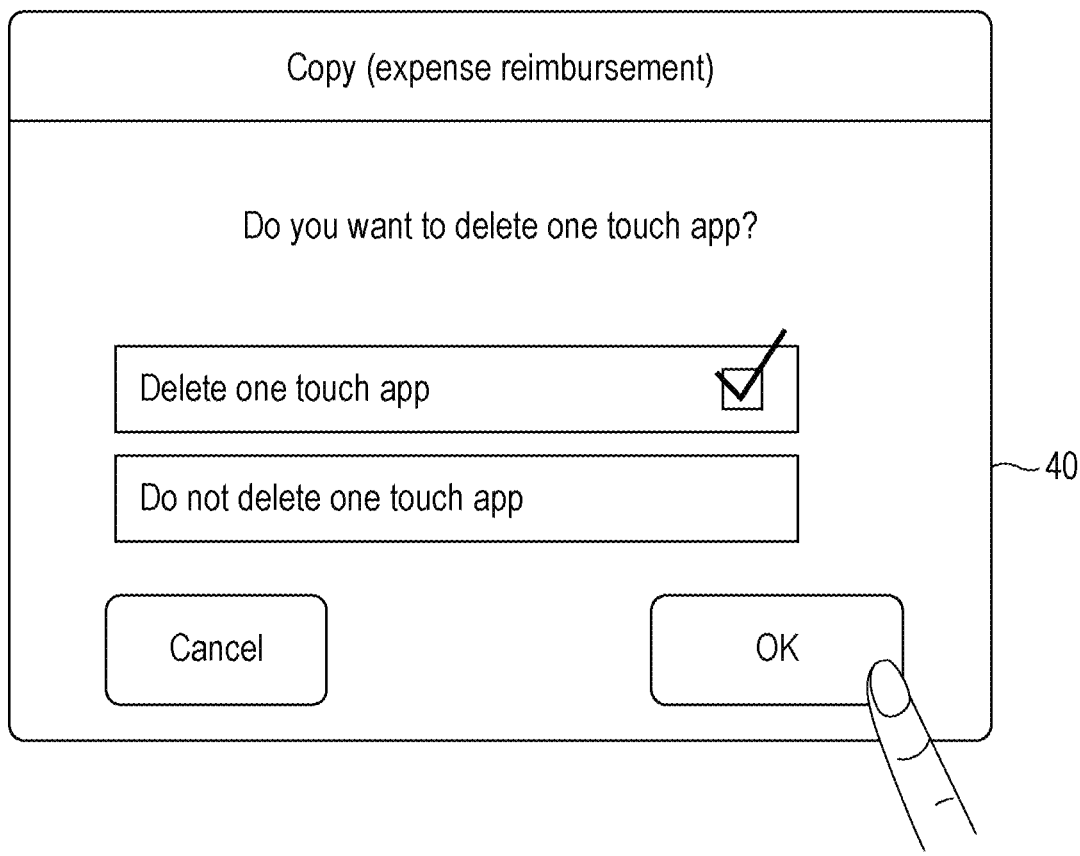
FIG. 27 illustrates an example of a delete checking screen for a one touch app displayed on the operation panel.

If the user selects "Delete one touch app" on the checking screen shown in FIG. 27 (YES in step S305), the controller 31 deletes the one touch app in step S306.

Figure 28:
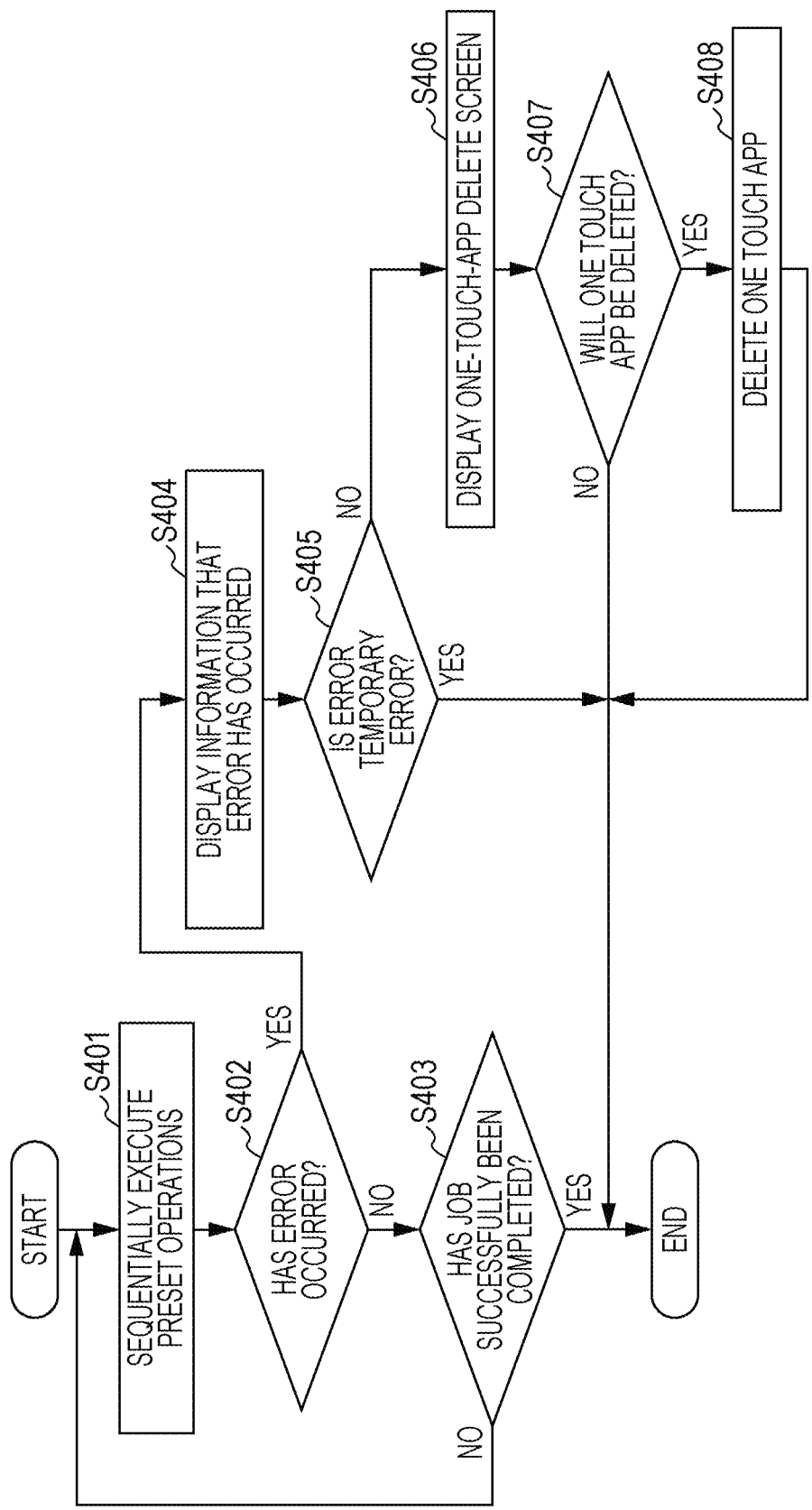
FIG. 28 is a flowchart illustrating details of an operation executed by the image forming device when executing a job of a one touch app.

Details of an operation executed by the image forming device 10 when executing a job of a one touch app will be described below with reference to the flowchart of FIG. 28.

When a one touch app is selected, the controller 31 sequentially executes operations set in the one touch app in step S401. Unless an error occurs (NO in step S402), the controller 31 continues to execute operations until the job has successfully been completed in step S403.

If an error occurs (YES in step S402), the controller 31 displays information that an error has occurred on the operation panel 40 in step S404.

The controller 31 then determines in step S405 whether the error is a temporary error. The temporary error is an error that can be recovered from and allows the job to be restarted with the passage of time or a certain operation. An example of the temporary error is a shortage of the space of an HDD. In contrast, a permanent error is an error which is not easily recovered from due to a change in the configuration of the image forming device 10.

If the error is a temporary error (YES in step S405), the controller 31 terminates the processing.

If the error is not a temporary error, that is, a permanent error (NO in step S405), in step S406, the controller 31 displays a checking screen for deleting a one touch app, such as that shown in FIG. 27.

If the user selects a "Delete one touch app" button on the checking screen shown in FIG. 27 (YES in step S407), the controller 31 deletes the one touch app in step S408.

The appearance of a one touch app icon displayed on the operation panel 40 may be changed so that a user can understand that a certain setting registered in the one touch app icon has been changed. A specific example of such a case will be discussed below with reference to FIGS. 29A, 29B, and 29C.

Figure 29A:
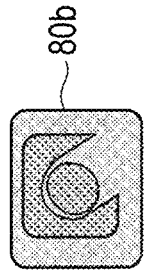
FIGS. 29A, 29B, and 29C illustrate a specific example showing how the appearance of a one touch app icon changes in accordance with whether a certain setting registered in the one touch app icon has been changed.
Figure 29B:
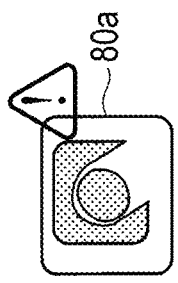

FIG. 29A shows an example of the appearance of the one touch app icon 80 when the state of the image forming device 10 is not changed after the one touch app icon 80 has been created. Thereafter, the state of the image forming device 10 is changed, and a setting registered in the one touch app icon 80 is changed. An example of the appearance of a one touch app icon 80a when the item of the changed setting is included in the items of settings accepted by the user is shown in FIG. 29B. An example of the appearance of a one touch app icon 80b when the item of the changed setting is not included in the items of settings accepted by the user is shown in FIG. 29C.

FIG. 29B shows that an exclamation point is added to the top right of the one touch app icon 80a in contrast to the one touch app icon 80 in the normal state shown in FIG. 29A. Then, the user can understand in advance that a certain setting registered in the one touch app icon 80a which is accepted by the user has been changed.

Figure 29C:
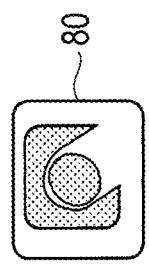

FIG. 29C shows that the one touch app icon 80b is grayed out and is not selectable so that the user can understand in advance that a certain setting registered in the one touch app icon 80b which is not accepted by the user has been changed.

In this exemplary embodiment, concerning a one touch app for which the automatic execution mode is selected, if a certain item of a setting accepted by a user is changed, the one touch app is immediately executed without displaying a checking screen for the user when the one touch app icon is selected. Even in this case, however, if the type of processing of a one touch app satisfies a preset condition, the checking screen may be displayed for the user.

That is, even if a state change detected by the state detector 36 is a change concerning an item of a setting for which a user accepts that the setting will be changed, the controller 31 may not immediately execute the processing of the one touch app if the content of the processing is a preset content of processing.

For example, if the setting of a setting item, such as the color mode or the number of copies, which may change billing conditions, is changed, the controller 31 may display a checking screen for the user. If the setting of a setting item, which does not change billing conditions, is changed, the controller 31 may immediately execute the one touch app without displaying a checking screen for the user.

If the setting of one of preset plural items of settings is changed, the controller 31 may immediately execute the one touch app without displaying a checking screen for the user. If plural settings which exceed the preset number of plural items of settings are changed, the controller 31 may display a checking screen for the user.

When sending data to an external source, such as in the case of fax sending or sending of scanned image data to a specified external device, or when the content of a changed setting is likely to cause an unfavorable result if a user does not accept the changed setting, such as when thirty copies or a greater is set, the controller 31 may display a checking screen for the user.

It is assumed that a checking screen is displayed for the user because the setting of a setting item which is not accepted by the user has been changed. In this case, if the user agrees that the one touch app will be executed, from next time when the one touch app is selected, the controller 31 may immediately execute this one touch app without displaying a checking screen.

That is, once the user agrees that the one touch app will be executed on the checking screen, from next time when the one touch app is selected, the controller 31 immediately starts executing the one touch app without displaying the checking screen.

A modified example will now be described below. In the above-described exemplary embodiment, processing execution data such as a one touch app is created and used in the image forming device 10. However, in the invention, another type of processing execution data may be created and used in another type of information processing apparatus. For example, various information processing apparatuses, such as smartphones, tablet terminal devices, cellular phones, and laptop personal computers, may create and utilize processing execution data for executing specified processing.

For example, an exemplary embodiment of the invention may be applied to a function called Wi-Fi (registered trademark) assist used in a cellular phone. Wi-Fi assist is the following function. If a user is using Wi-Fi with a poor Wi-Fi connection and is unable to download data, Wi-Fi assist is activated and switches Wi-Fi connection to a cellular network, so that the user can stay connected to the Internet and continue downloading data by using the cellular network.

However, in data communication using the cellular network, the maximum amount of data traffic is usually set, and the user may want to avoid downloading a large amount of data, such as video data, by using the cellular network.

An app, such as a browser, for downloading and displaying data of a specified webpage may be used as processing execution data. In this case, to satisfy the above-described user demand, downloading of a web page having a small data amount, such as a web page described in Hyper Text Markup Language (HTML), is registered as an item of a setting which is accepted by a user, while downloading of a web page having a large data amount, such as a web page including video data, is registered as an item of a setting which is not accepted by the user.

Then, when a state detector detects a change in the communication state, such as a poor Wi-Fi connection, the app, such as a browser, determines in the following manner whether a web page will be downloaded. When the web page is the one written in HTML, the browser downloads the web page without checking with the user. When the web page is the one including video data, the browser displays a checking screen for the user and downloads the web page only when the user agrees to download it. Alternatively, the user may fail to even open such a web page or to select the app.

As discussed above, an exemplary embodiment of the invention may also be applied to processing execution data other than a one touch app.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an execution unit that executes, when processing execution data for executing a one touch app including specified processing is selected, the specified processing of the one touch app with a setting set in the processing execution data, the one touch app being created by a user;
   a detector that detects a state change in the information processing apparatus;
   a receiver that receives, when the user is creating the one touch app, a selection from the user of an item of a setting for which the user accepts that the setting will be changed in a case where the state change detected by the detector is a change concerning the selected item; and
   a controller that controls the receiver, if the state change detected by the detector is the change concerning the selected item, so that the setting of the item will be changed and then execution of the processing of the processing execution data will be accepted, wherein
   even if execution of the selected item fails due to the detected state change, the one touch app is automatically started without checking with the user when the user has accepted that the setting will be changed,
   if the state change detected by the detector is a change concerning an item of a setting for which the user does not accept that the setting will be changed, the controller either: (i) controls the receiver so that execution of the processing of the processing execution data will not be accepted; or (ii) displays on a display a checking screen for the user indicating content of changing of the setting before starting to execute the processing of the processing execution data.

2. The information processing apparatus according to claim 1, wherein, if the controller controls the receiver so that execution of the processing of the processing execution data will not be accepted, the controller displays on a display an icon corresponding to the processing execution data such that the icon is not selectable.

3. The information processing apparatus according to claim 1, wherein, if the user cancels execution of the processing execution data on the checking screen, the controller asks the user whether to delete the processing execution data, and if the user selects deletion of the processing execution data, the controller deletes the processing execution data.

4. The information processing apparatus according to claim 1, wherein, if the user allows execution of the processing execution data on the checking screen, from next time when the processing execution data is selected, the controller starts executing the processing of the processing execution data without displaying the checking screen.

5. The information processing apparatus according to claim 1, wherein, if an error occurs while the processing of the processing execution data is being executed, the controller asks the user whether to delete the processing execution data, and if the user selects deletion of the processing execution data, the controller deletes the processing execution data.

6. The information processing apparatus according to claim 1, wherein, if the controller controls the receiver so that an item of a setting for which the user accepts that the setting will be changed will be changed, and then, execution of the processing of the processing execution data will be accepted, the controller displays on a display an icon corresponding to the processing execution data so as to allow the user to understand that a certain setting set in the processing execution data has been changed.

7. The information processing apparatus according to claim 1, wherein, even if a state change detected by the detector is a change concerning an item of a setting for which the user accepts that the setting will be changed, the controller does not execute the processing of the processing execution data if content of the processing is a preset content of processing.

8. The information processing apparatus according to claim 1, wherein, after starting to execute the processing of the processing execution data, the controller displays on a display information that the processing of the processing execution data is being executed after a certain setting set in the processing execution data has been changed.

9. The information processing apparatus according to claim 8, wherein the controller displays on the display an item of a setting for which the setting has been changed.

10. A non-transitory computer readable medium storing a program causing a computer to execute a process, the process comprising:

an execution unit that executes, when processing execution data for executing a one touch app including specified processing is selected, the specified processing of the one touch app with a setting set in the processing execution data, the one touch app being created by a user;

detecting a state change in an information processing apparatus;

receiving, when the user is creating the one touch app, a selection from the user of an item of a setting for which a user the user accepts that the setting will be changed in a case where the detected state change is a change concerning the selected item;

controlling, if the detected state change is the change concerning the selected item, processing so that the setting of the item will be changed and then the execution of the processing of the processing execution data will be accepted;

even if execution of the selected item fails due to the detected state change, automatically starting the one touch app without checking with the user when the user has accepted that the setting will be changed; and if the detected state change is a change concerning an item of a setting for which the user does not accept that the setting will be changed, either: (i) performing control so that execution of the processing of the processing execution data will not be accepted; or (ii) displaying on a display a checking screen for the user indicating content of changing of the setting before starting to execute the processing of the processing execution data.

* * * * *